(12) United States Patent
Kouretas et al.

(10) Patent No.: US 7,873,035 B2
(45) Date of Patent: *Jan. 18, 2011

(54) METHOD AND APPARATUS FOR VOICE-OVER-IP CALL RECORDING AND ANALYSIS

(75) Inventors: Stephen Kouretas, Somerset, NJ (US); Abhay Dutt, Jackson, NJ (US); Pin Lo Chen, Montville, NJ (US); Donald Howell, High Bridge, NJ (US); Murali Sampath, Morganville, NJ (US); Aziz Mzili, Hillsborough, NJ (US); Dongping Lan, Oak Ridge, NJ (US); Lujia Zeng, Piscataway, NJ (US)

(73) Assignee: AudioCodes, Inc., Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/466,670

(22) Filed: May 15, 2009

(65) Prior Publication Data

US 2009/0303897 A1 Dec. 10, 2009

Related U.S. Application Data

(63) Continuation-in-part of application No. 11/311,557, filed on Dec. 19, 2005, now Pat. No. 7,548,539.

(51) Int. Cl.
*H04L 12/66* (2006.01)
*H04L 12/28* (2006.01)
*H04M 1/67* (2006.01)

(52) U.S. Cl. .................. 370/356; 370/392; 379/68; 379/85

(58) Field of Classification Search ........................ None
See application file for complete search history.

(56) References Cited

U.S. PATENT DOCUMENTS

| | | | |
|---|---|---|---|
| 5,937,029 A | 8/1999 | Yosef | |
| 6,122,665 A | 9/2000 | Bar et al. | |
| 6,330,025 B1 | 12/2001 | Arazi et al. | |
| 6,542,602 B1 | 4/2003 | Elazar | |
| 6,690,950 B2 | 2/2004 | Takagi et al. | |
| 6,724,887 B1 | 4/2004 | Eilbacher et al. | |
| 6,751,297 B2 | 6/2004 | Nelkenbaum | |
| 6,760,420 B2 | 7/2004 | Heilmann et al. | |
| 6,766,000 B2 | 7/2004 | Squibbs et al. | |
| 6,856,343 B2 | 2/2005 | Arazi et al. | |

(Continued)

*Primary Examiner*—Melanie Jagannathan
(74) *Attorney, Agent, or Firm*—Hoffmann & Baron, LLP

(57) ABSTRACT

A method and computer-readable medium for obtaining information associated with a VoIP communication session includes tapping the computer network passively to obtain signaling and media information in a first format, separating the signaling and media information, determining transport information from at least one of the signaling and media information, transcoding the media information to a second format, and storing the transcoded media information in the second format. The media information includes data, voice, audio, and/or video information. A system obtain information associated with a VoIP communication session on a computer network includes a tapping device to passively tap the computer network to obtain signaling and media information in a first format, a processing device to transcode the media information from the first format to a second format, separate the signaling information from the media information, and determine transport information from at least one of the signaling and media information, and a storage device to store the transcoded media information in the second format.

29 Claims, 23 Drawing Sheets

U.S. PATENT DOCUMENTS

| | | |
|---|---|---|
| 6,865,604 B2 | 3/2005 | Nisani et al. |
| 6,871,229 B2 | 3/2005 | Nisani et al. |
| 7,054,420 B2 | 5/2006 | Barker et al. |
| 7,076,427 B2 | 7/2006 | Scarano et al. |
| 7,184,526 B1 | 2/2007 | Cook |
| 7,227,930 B1 | 6/2007 | Othmer et al. |
| 2002/0071529 A1 | 6/2002 | Nelkenbaum |
| 2003/0142805 A1 | 7/2003 | Gritzer et al. |
| 2004/0019700 A1 | 1/2004 | Ilan et al. |

Non-RFC2198 RTP packet structure

RFC2198 RTP packet structure

METHOD AND APPARATUS FOR VOICE-OVER-IP CALL RECORDING AND ANALYSIS

CROSS REFERENCE TO RELATED APPLICATION

This application is a continuation-in-part of U.S. application Ser. No. 11/311,557, filed on Dec. 19, 2005, which claims the benefit of U.S. Provisional Application No. 60/659,965, filed on Mar. 8, 2005, the disclosures of which are incorporated herein by reference.

BACKGROUND

1. Field

The present invention generally relates to passive recording of audio, voice, video, and data information transmitted over a network, and more particularly relates to Voice-over-Internet Protocol (VoIP) recording and analysis.

2. Description of the Related Art 1.0 Introduction to VoIP Recording

Since the mid-1990s, Voice over IP (VoIP) has steadily changed the telecommunications industry. The convergence of data and voice in the communications market allows for value-added services not available on traditional circuit-based networks, in addition to cost saving advantages. VoIP technology enables businesses to reduce costs, consolidate and simplify networks, and improve customer service applications. VoIP, once viewed as just a new technology, is now recognized as a reliable and cost-effective business solution.

To remain competitive, businesses that develop call-recording applications must now implement VoIP solutions. VoIP recording will be discussed and differentiated from traditional circuit-based recording by starting with an overview of the IP telephony network and then examining the unique challenges of VoIP call recording. A suite of components available under the mark IPX/IPR from Ai-Logix, Somerset, N.J. 08873, which are designed to support VoIP call recording applications, will then be discussed.

VoIP, also known as Internet telephony, IP telephony, packet-voice, packetized voice, and Voice-over-IP, transmits voice traffic in the form of packets. Since VoIP is reliable and efficient, call centers seeking to improve customer service and to reduce network costs have adopted it. Looking ahead, call-recording businesses are expected to do the same.

1.1 Hierarchical VoIP Network Structure

A typical IP network includes interconnected routers that form a packet switching fabric. VoIP is designed to take advantage of this IP infrastructure. There are many ways to add VoIP technology to a LAN network. The simplest design requires the addition of a VoIP call control server, such as the Call Agent 26 shown in FIG. 4. This server 26 provides the logic and control functions required to maintain the call state. In this scenario, a phone call from the Internet 28 enters the local network via a router 30. Signaling information passes to the Call Agent 26, which then sets up and manages the call. Once a connection is established, the voice conversation passes directly from the router 30 to the IP phone via LAN switches 32. Unlike circuit-based systems, where voice traffic passes along the same cable as signaling traffic, VoIP technology may separate the two.

1.1.1 Hybrid Networks

VoIP networks can also be designed to interface with a conventional Public Switched Telephone Network (PSTN) network, usually a T1 or E1 line, as shown in FIG. 5. In this situation, a Gateway 34 is used to convert traffic between the two networks. In some scenarios, the local phone network consists entirely of IP telephones 36 and a Call Agent 38 that manages call states. In other environments, the local phone system is a combination of VoIP and conventional PSTN phones. In this case, call control requires both a Call Agent, and a conventional PBX. Alternatively, hybrid PBXs can be used so that VoIP and PSTN phones can coexist.

1.1.2 Integrating Distant Offices

VoIP technology enables businesses with distant offices to reduce operating costs by consolidating and simplifying network design as shown in FIG. 6. Many companies, specifically those with worldwide call centers, adopt VoIP technology for this reason. As a hypothetical example, assume a call center has three offices (segments) located in California 40, New York 42, and Texas 44. With VoIP technology, a single Call Agent 46 manages call control on all three networks while the local network's existing Ethernet switches voice traffic to/from IP phones 48. Operational costs decrease dramatically because a separate telephone network is no longer required. FIG. 6 illustrates the efficiency of VoIP technology.

1.2 Customer Expectations 1.2.1 VoIP Recording

For a business that purchases a call recorder, VoIP simply allows networks to carry telephone conversations. Customers who already have a conventional recording system expect enhanced capabilities from a new VoIP recorder. Customers who are new to call recording have their unique business requirements in mind and are looking to solve their business objectives. Ultimately, customers focus on the recording product's features, rather than on the underlying VoIP technology.

Application developers who design call-recording systems recognize VoIP technology's ascendancy. A VoIP recorder is important to remain competitive in the call recording market. This recorder must be able to provide, at least, the same features available on PSTN recording applications.

Passive call recording systems rely on hardware components that tap into the telephone network and direct data into a recording application. Recording applications require the same data: the voice conversation (for recording purposes), the call control information (to monitor call states), and data for value added services, such as DTMF, CallerID, and the like.

1.3 Features Distinguishing a VoIP Network

VoIP's packet-based network presents a new tapping environment with a unique set of challenges. When designing a VoIP recording system, it is important to carefully research these differences and plan for them.

1.3.1 Jitter and Synchronization

One of the most significant differences introduced by VoIP is how audio data arrives. In a conventional circuit-based network, once a call is established, the physical path between the two endpoints is fixed. In analog systems both upstream and down-stream traffic are carried on the same wire and are presented as a waveform. In digital systems, up-stream and down-stream traffic are carried on separate wires, but are synchronized to prevent interruptions within the call. In the IP world, the two endpoints are not fixed and are viewed as connectionless. Media RTP packets carrying voice data for a single call can be routed through different paths. As a result, packets of voice data arrive at the endpoint at different times (jitter) and out of sequence.

To compensate for jitter, IP data networks use buffers to store incoming packets. This allows the network to compensate for delayed packets before the data is eventually sorted and passed to the end user. This system is designed for data networks where real-time guarantees are not required and delays in packet delivery are acceptable. However, on a telephone network, delayed packets reduce voice quality. Packet buffering, though required on a VoIP network, must meet or exceed the standards of a telephone network, which specify a maximum delay of 500 ms.

Assuming an Ethernet cable is tapped for voice packets and the VoIP recorder intercepts the packets before they have been buffered, the packets pulled off the network are misaligned and, predictably, the audio quality is poor. To compensate for this, hardware components used for VoIP call recording preferably time the buffering of incoming packets.

1.3.2 Packet Filtering

In a conventional circuit-based telephone network, the line is used to transmit only voice data. On an IP network, many types of packets, such as data, voice, audio, and media, are present on the same Ethernet cable. Packet filtering is the selective passing or blocking of packets as they pass through a network interface. Packet filtering is used by VoIP recording systems to isolate voice related packets from the other data and media packets.

Many conventional VoIP recorders rely on host resources for packet filtering. This is a viable solution on networks with light traffic. However, this system is not scalable and quickly reaches its limits when the system density grows beyond 100 ports. A better solution is a logging system that uses hardware components capable of packet filtering. This system would no longer be limited by host resources and provides a scalable solution for low- and high-density environments.

1.3.3 Voice CODECS

An important consideration in the design of any logging or recording system is its ability to encode and decode numerous compression schemes. Like all recording environments, the type of CODEC used for media transport is controlled by the network. As a result, when selecting hardware components for call recording, application developers prefer products that support multiple CODECs. This is crucial when tapping a VoIP network. When call setup is negotiated between two Call Agents, the media format is also negotiated. As a result, the type of media format used can change from call to call on one network. Unlike circuit-based recording systems, a VoIP recorder has the ability to determine the type of media format on a per call basis. This is accomplished by decoding the packet's header, in which the media format is identified. Currently, the formats, G.711, G.723.1, or G.729A, G.722 are prevalent on most VoIP networks, but are not limited to these formats, and are preferably supported by recording hardware.

The type of media format used for recording is driven by the business needs of the customer. Application developers are often asked to design one system that maximizes storage capabilities and then another system that requires web-enabled playback. The best approach preferably provides a versatile hardware component capable of encoding a variety of media formats. Components that offer both low bit rate CODECS and wav header support are preferred by application developers to meet these market requirements.

1.3.4 Signaling

Call recording applications typically rely on hardware components to interpret call control and signaling information. Applications monitor call states to observe line activity and control the recording process. Some applications are designed to monitor the caller's experience or agent behavior. These recorders rely on detailed information, such as hold states, to complete their task.

Tapping into a VoIP network requires a component capable of decoding VoIP protocols. More than one type of protocol is used on VoIP networks, but the most common are H.323 and SIP. Also, many PBX manufacturers have designed proprietary protocols to manage call control between the PBX and IP phones. SCCP (Skinny), which is available from Cisco Systems, Inc. (www.cisco.com) is one example. The call logging system is preferably designed around a hardware component capable of decoding standard and proprietary VoIP environments. When designed properly, this single solution would be able to integrate with any VoIP network.

1.3.5 Transporting DTMF

A DTMF signaling system detects touch-tone dialing. When a button on a touch-tone phone is pressed, the tone is generated, compressed, transported to the other party, and then decompressed. On VoIP networks, which use low-bandwidth CODECs, the tone may be distorted during compression and decompression. To address this, VoIP protocols include a relay method that allows for out-of-band DTMF delivery. Relay methods vary from network and include the following:

1. Real-Time Transport Protocol (RTP) can be used to carry specially marked RTP packets. Here the DTMF tones are sent in the same RTP channel as the voice data. The DTMF tones are encoded differently from the voice samples and are identified by a different RTP payload type code.

2. When H.323 is used, either the H.245 signal or H.245 alphanumeric method is available. These methods separate DTMF digits from the RTP channel and send them through the H.245 signaling channel.

3. Using Named Telephone Events (NTE). Using NTE to relay DTMF tones provides a standardized means of transporting DTMF tones as RTP packets. With the NTE method, the endpoints perform per-call negotiation of the DTMF relay method.

At the time a VoIP network is deployed, the preferred DTMF delivery method is selected. However, calls are not processed uniformly. There are cases when the actual delivery method differs from the preferred delivery method. This underscores the importance of selecting a versatile recording component.

1.3.6 Encryption

Companies that have experienced security problems with their data networks are concerned about security with VoIP. There are standards for encrypting data on VoIP networks and some companies are using them. What this mean to the call recording industry depends on the type of encryption method deployed.

Companies typically encrypt data passing between office locations over a Virtual Private Network (VPN). The data encryption/decryption takes place at the endpoints of the VPN, which is external to the local network. The data passing along the local network is unsecured. The voice related packets between the VPN and the IP phones are not encrypted. A tap positioned anywhere on the local network is capable of recording.

Alternatively, the data could be encrypted at the endpoints, that is, at the IP phones. VoIP traffic traveling along the local network is encrypted and cannot be tapped. Conventional IP phones generally lack the processing resources for this type of implementation. It is also expensive for a company to deploy. It is unlikely that a call recording company would encounter this type of environment.

1.3.7 Data Path

On traditional telephone networks, voice and call control information pass through a central location, that is, the switch or PBX. Each channel on the network is tapped individually, and a central tapping system obtains all voice and call control information on the local network. With VoIP, when an incoming or outgoing call is initiated, only the call control information is passed along the Ethernet to the Call Agent. After call setup is complete, the voice packets are passed to the endpoint, which is either a phone on the external network or a local IP phone. An IP network does not have a central location where voice and call control information converges. FIGS. 7 and 8 illustrate this concept.

In FIG. 7, an incoming call enters the external facing Router or Gateway 50. The call control passes to a Call Agent 52, which then negotiates the call with a local IP phone 54. Once the call is connected, the voice packets pass directly to the phone.

In FIG. 8, Agent 1 56 initiates a call to Agent 2 58. Call control information passes to the Call Agent 60. Once the call is initiated, the voice packets pass directly to the other local IP phone. The two phones are connected to the same switch, so the voice packets do not leave this LAN segment.

Recording on the VoIP network may be accomplished in one of the two methods: Active Recording and Passive recording. These two methods are described in Section 2 and Section 3 below respectively. Passive recording is the invention of this application.

2.0 Active Recording on a VoIP Network

The introduction of Voice-over-Internet Protocol (VoIP) telephone networks greatly changed the design of call recording systems. On a VoIP network, voice traffic is packetized and travels across the corporate data network (LAN/WAN), not over traditional copper twisted-pair wiring. This greatly changed the methods that could be used to tap into the telephone network. Hardware components used to tap the wires on circuit-based telephone networks must be replaced with alternative methods.

Active recording is one method that can be used to implement a VoIP recording solution. A software interface is used by a call logging application to monitor call states on the VoIP network. When a call needs to be recorded, third party call control is used to actively join the recorder into the conversation through a conference bridge. The recorder is designed with a media component for terminating the active call.

Active recording provides a viable solution for integrating an existing call recording solution to a VoIP network. Third party call control and the use of a VoIP Media component for recording, which is available as part number IPM260 from Ai-Logix, Inc., Somerset, N.J. 08873, will now be discussed.

Active recording is designed so that the call recorder becomes an active participant with each call on the network. This is accomplished by creating a conference bridge between the call's endpoints and the recording device. Using a software interface, the logging application monitors all calls on the network and controls recording by initiating the conference bridge. Once the call recorder is bridged into the call, the conversation is accessible for recording purposes. In this scenario, call negotiation is required between the IP Private Branch Exchange (PBX) and the recorder. An endpoint is defined herein as a point of entry and exit of media flow. It is a service terminating point that can be either physical (a phone or T1/E1 port) or virtual (a conference server, or a media resource, or the like).

Active call recording works in the following way:

1. The logging application monitors all calls on the network via a Computer Telephony Integration (CTI) interface, which refers to a system that enables a computer to act as a call center by accepting incoming calls and routing them to an appropriate device or person.

2. To start recording, the logging application commands the PBX to initiate a conference bridge.

3. The IP PBX invites the VoIP Media component and conferences it into the call.

4. The VoIP Media component terminates the Real-Time Transport Protocol (RTP), which is an Internet protocol for transmitting real-time data, such as audio and video. RTP does not guarantee real-time delivery of data, but provides mechanisms for the sending and receiving applications to support streaming data.

5. The Media component records the voice and passes the recording to the database.

It is to be noted that silence observation or 3-way conference capability are required on the IP PBX 2.1 Third Party Call Control Third party call control enables an external entity to setup and manage a communications relationship between two or more other parties via a software interface. In this scenario, the logging application relies on third party call control to initiate a conference bridge making the recording device an active participant.

As shown in FIG. 1, most IP PBXs are designed with a Call Control Server (Call Agent) 10, which runs on a personal computer independent of the PBX. The Call Agent 10 manages all calls on the network, and negotiates call setup and tear down. The Call Agent 10 is connected to an IP PBX 12 via a specialized communications protocol. Two technologies have been proposed for this interface: Computer Supported Telecommunication Applications (CSTA) and Switch to Computer Application Interface (SCAI). However, most PBX vendors have adopted CSTA as the industry standard. CSTA is the base on which a Telephony Server API (TSAPI) is defined. Almost every CSTA service has a one-to-one correspondence to a TSAPI function call. To open this system up for CTI application development, PBX manufacturers provide an Application Program Interface (API) (usually TAPI or JTAPI) that allows an external application to directly interface with the PBX 12. An API is a set of routines, protocols, and tools for building software applications. This client/server architecture extends telephone functionality to the logging application.

The Call Agent's API enables a speech/data application to setup and tear down calls, monitor call progress, detect Calling Line Identification (CLID), perform identification, and activate features, such as hold, transfer, conference, park, and pickup. It can redirect, forward, answer, and route incoming calls. It is also possible to generate and detect Dual Tone Multi-Frequency (DTMF) signals, which is the system used by touch-tone telephones to assign a specific frequency (including two separate tones) to each key so that it can easily be identified by a microprocessor.

To implement Third Party Call Control, a logging application 14 with a CTI interface accesses the Call Agent's API. From the CTI interface, the application 14 monitors each call. When recording is required, the logging application 14 commands the PBX 12 through the CTI interface to create a conference bridge. This client/server architecture extends telephone functionality to the logging application.

2.2 VoIP Media Component

Unlike passive recording solutions, active recording solutions participate with each call on the network. As a result, the logging application 14 is able to negotiate and terminate calls originating from the IP PBX 14. In the example shown in FIG. 2, a Media Component 15, such as the IPM260 available from Ai-Logix, Inc. is installed on a computer hosting the logging application 16. The IPM260 provides RTP termination, buffer, and synchronization capabilities, as well as recording.

When a call needs to be recorded, the call logging application 16 uses third party call control to request a conference bridge. The IP PBX 12 initiates a call to the IPM260. When the call is accepted, the IP PBX 12 creates a conference bridge with one leg terminating on the IPM260.

Call negotiation is required between the IPM260 and the IP PBX 12. Call negotiation is managed by a Call Control Interhop (hosted by the logging application 16). The IPM260 supports the Media Gateway Control Protocol (MEGACO) services, which is configured to point to the Call Control Interop. A gateway is defined herein as a system or device that links two dissimilar networks or domain. The interop must support the same protocol used on the local VoIP network (SIP or H.323). Once the call is accepted, a channel is opened on the IPM260 for the incoming RTP stream. Since both sides of the conversation have been summed by the conference bridge on the PBX 12, the complete conversation is passed into the IPM260 as a single stream.

A channel is defined herein as a concatenation of layers within the network to establish a path between two endpoints. A channel is generally the smallest subdivision of a transmission system. A channel may also be defined as a media-processing instance.

One of the most significant differences introduced by VoIP is how audio data arrives at an endpoint. On a conventional circuit-based network, the physical path between the two endpoints is fixed once a call is connected.

In the IP world, the two endpoints are not fixed and are viewed as connectionless. Media RTP packets carrying voice data for a single call can be routed through different paths. As a result, packets of voice data arrive at the endpoint at different times (jitter) and out of sequence. Designed for VoIP networks, the IPM260 supports both buffering capabilities (for removing jitter) and synchronization services. These capabilities are essential for high quality recordings.

2.3 Architecture of an Active Call Recording System

Like all recording systems, an active recording system must have access to signaling information to monitor call states and access to voice data for recording purposes. An active call recording system is preferably capable of initiating a conference bridge and terminating an incoming call. This requires third party call control as well as a Media Component 15 capable of terminating voice data. A simple active recording solution can be built with the following components shown in FIG. 3:

1. A CTI Interface 18, which interfaces with the CTI server (Call Agent 20) for third party call control. The CTI interface 18 is also used by a logging application 22 to obtain call details, such as call state, phone number, date, agent name, and DTMF.

2. A VoIP Media Component 17, which is a hardware component installed on the logging server. The VoIP Media component terminates a third leg 19 of the conference call. It then performs recording services.

3. A Call Control Interop 24, which is required for call negotiations between the IP PBX 12 and the Media Component 17.

In a call-recording environment, most call center operators want to record the total call experience. That is, they want to collect information such as which agent their customers are talking with, how soon they are transferred, how long they were on hold, and other information that may be displayed on the agent's terminal. In conventional circuit switching environments, call center recording is accomplished by monitoring the telephone port on a PBX or a switch where:

1. The PBX or switch uses centralized Start topology such that all telephone interfaces are distributed from the PBX or Switch.

2. Each telephone port includes only one conversation.

3. Voice is synchronized in both directions and the delay difference is negligible.

4. Signaling and voice information appear on the same pair of wires.

However, recording voice in a VoIP environment is different in the following ways:

1. The IP network uses a tree topology and each IP network element includes a switching function. Therefore, a call on the VoIP network is not distributed through a central switch as it is done in the circuit-switching environment. As a result, monitoring VoIP is not as straightforward as monitoring a PBX.

2. The IP link is a shared resource, such that there are media types other than voice and there is more than one conversation on the same IP link. Therefore, the recorder must be able to differentiate voice packets from non-voice packets and be able to differentiate one call from another.

3. The VoIP packets in each direction can experience different delays, and the packet delays in one direction can be different from one packet to another. Sometimes, the voice packets can reach the destination out of sequence. As a result, the tapping apparatus must have the ability to synchronize the two voice streams of a conversation. This differs from circuit networks where the voice is delivered in order and synchronization is maintained by network design.

4. When a call agent is used, the signaling data and the voice data can be carried on a different IP link.

Therefore, there is a need for a method and apparatus that can record data, voice, audio, and video from a computer network, such as a VoIP network, without requiring modification of an associated telephone system or impairing normal operation of the network and telephone system.

SUMMARY

The foregoing needs, purposes, and goals are satisfied in accordance with the present invention that, in one embodiment, provides a method of obtaining information associated with a VoIP communication session on a computer network including tapping the computer network passively to obtain signaling information and media information in a first format, separating the signaling information from the media information, determining transport information from at least one of the signaling information and media information, transcoding the media information to a second format, and storing the transcoded media information in the second format, thereby monitoring information associated with a VoIP communication session on a computer network without requiring modification to the computer network and without impairing operation of the computer network.

The media information includes at least one of data, voice, audio, and video information. The first and second formats may include, but are not limited to at least one of G.711, A-law PCM, mu-law PCM, linear PCM, G.723.1, G.7227, G.722, G.729a, G.729b, G.722, GSM610, GSM-MS, NetCoder, and Oki-ADPCM. The method may further include determining whether an internet protocol (IP) address associated with the media information matches an IP address associated with the communication session, and discarding the media information in response to determining that the IP address associated with the media information does not match the IP address associated with the communication session.

The information in the second format preferably requires less storage space than the information in the first format, and the network preferably includes at least one of an internet protocol (IP)-based network, local area network (LAN), and a wide area network (WAN). The information may be associated with a plurality of communication sessions, and the method may include retrieving the stored information and replaying the retrieved information in response to a request by a user. The network may be tapped to obtain information flowing in an upstream and a downstream direction on the network, and the signaling information preferably includes control information associated with the media information.

The transport information may include at least one of a quality analysis, Quality of Service (QOS) analysis, checksum analysis, dropped packet error analysis, TCP/UDP transport error analysis, packet delay analysis, packet retransmission rate analysis, latent call setup analysis, packet transport error analysis, dropped packet analysis, latency analysis, call setup analysis, cause of call being abandoned analysis, out-of-order packet analysis, retransmitted packet analysis, RTCP analysis, jitter analysis, packet count analysis, and missing audio packet analysis. The method may also include correlating the transport information to the VoIP communication session, and abstracting the transport information across a plurality of formats.

In another embodiment, the present invention provides a system adapted to obtain information associated with a VoIP communication session on a computer network including a tapping device adapted to passively tap the computer network to obtain signaling information and media information in a first format, a processing device adapted to transcode the media information from the first format to a second format, separate the signaling information from the media information, and determine transport information from at least one of the signaling information and media information, and a storage device adapted to store the transcoded media information in the second format, thereby monitoring information associated with a VoIP communication session on a computer network without requiring modification to the computer network and without impairing operation of the computer network.

The processing device may be adapted to determine whether an internet protocol (IP) address associated with the media information matches an IP address associated with the communication session, and to discard the media information in response to determining that the IP address associated with the media information does not match the IP address associated with the communication session. The processing device may be adapted to retrieve the stored information, and to replay the retrieved information in response to a request by a user. The passive tapping device may be adapted to obtain information flowing in an upstream and a downstream direction on the network.

The transport information may include at least one of a quality analysis, Quality of Service (QOS) analysis, checksum analysis, dropped packet error analysis, TCP/UDP transport error analysis, packet delay analysis, packet retransmission rate analysis, latent call setup analysis, packet transport error analysis, dropped packet analysis, latency analysis, call setup analysis, cause of call being abandoned analysis, out-of-order packet analysis, retransmitted packet analysis, RTCP analysis, jitter analysis, packet count analysis, and missing audio packet analysis. The processing device may also correlate the transport information to the VoIP communication session, and abstract the transport information across a plurality of formats.

In yet another embodiment a computer readable storage medium comprising instructions is provided that, when executed by a processing device, cause the processing device to obtain information associated with a VoIP communication session on a computer network by tapping the computer network passively to obtain signaling information and media information in a first format, separating the signaling information from the media information, optionally determining transport information from at least one of the signaling information and media information, transcoding the media information to a second format, and storing the transcoded media information in the second format, thereby monitoring information associated with a VoIP communication session on a computer network without requiring modification to the computer network and without impairing operation of the computer network.

The media information may include at least one of data, voice, audio, and video information. The first and second formats may include, but are not limited to at least one of G.711, A-law PCM, mu-law PCM, linear PCM, G.723.1, G.7227, G.722, G.729a, G.729b, G.722, GSM610, GSM-MS, NetCoder, and Oki-ADPCM. The processing device may further be caused to determine whether an internet protocol (IP) address associated with the media information matches an IP address associated with the communication session, and discard the media information in response to determining that the IP address associated with the media information does not match the IP address associated with the communication session.

The information in the second format preferably requires less storage space than the information in the first format, and the network preferably includes at least one of an internet protocol (IP)-based network, local area network (LAN), and a wide area network (WAN). The information may be associated with a plurality of communication sessions, and the processing device may further be caused to retrieve the stored information and replay the retrieved information in response to a request by a user. The network may be tapped to obtain information flowing in an upstream and a downstream direction on the network, and the signaling information may include control information associated with the media information.

The transport information may include at least one of a quality analysis, Quality of Service (QOS) analysis, checksum analysis, dropped packet error analysis, TCP/UDP transport error analysis, packet delay analysis, packet retransmission rate analysis, latent call setup analysis, packet transport error analysis, dropped packet analysis, latency analysis, call setup analysis, cause of call being abandoned analysis, out-of-order packet analysis, retransmitted packet analysis, RTCP analysis, jitter analysis, packet count analysis, and missing audio packet analysis. The processing device may further be caused to correlate the transport information to the VoIP communication session, and abstract the transport information across a plurality of formats.

These and other objects, features, and advantages of this invention will become apparent from the following detailed description of illustrative embodiments thereof, which is to be read in connection with the accompanying drawings.

DETAILED DESCRIPTION

3.0 Passive VoIP Call Recording

A public switched telephone network (PSTN) passive call recording systems is designed around components with high-impedance front ends. These components tap into the copper wiring on a telephone network and capture the signaling and voice components associated with a phone call.

Figure 1:
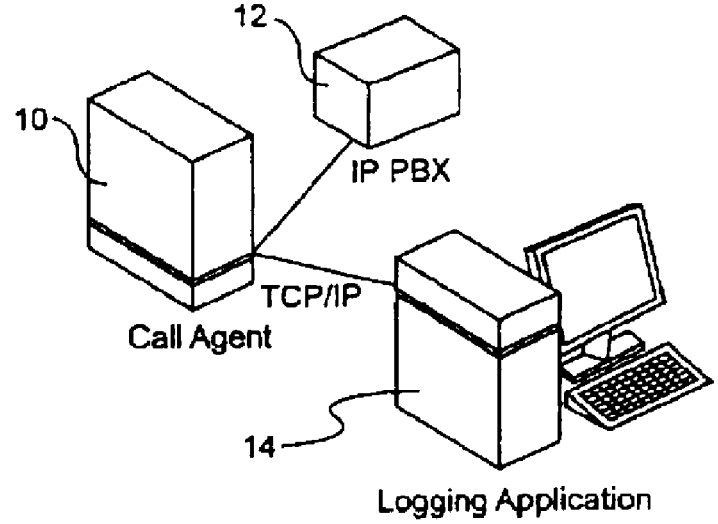
FIG. 1 is a block diagram of a system for implementing active third party call control in a Voice-over-Internet Protocol (VoIP) application.
Figure 2:
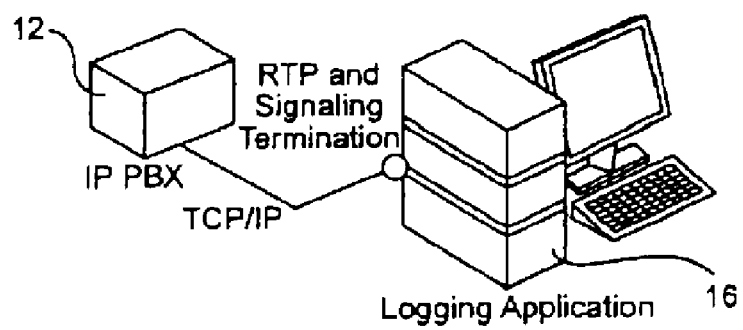
FIG. 2 is a block diagram of a system for implementing a VoIP Media Component used for active recording.
Figure 3:
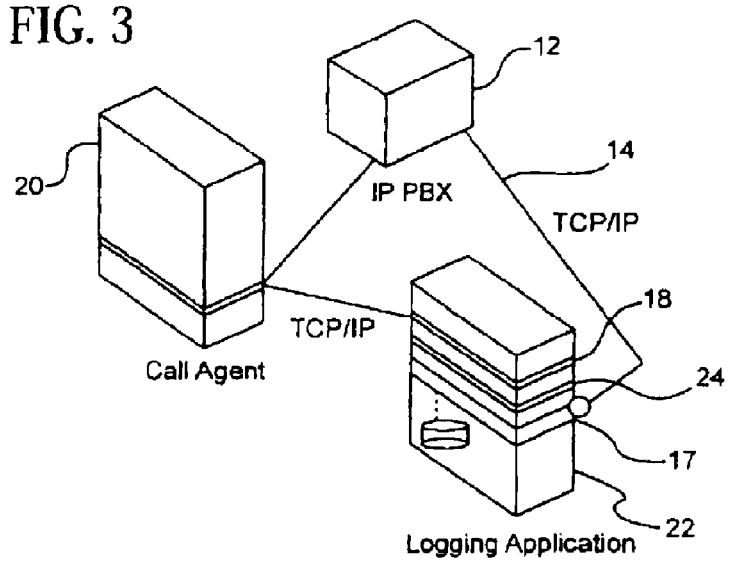
FIG. 3 is a block diagram of a system for implementing active recording in a VoIP network.
Figure 4:
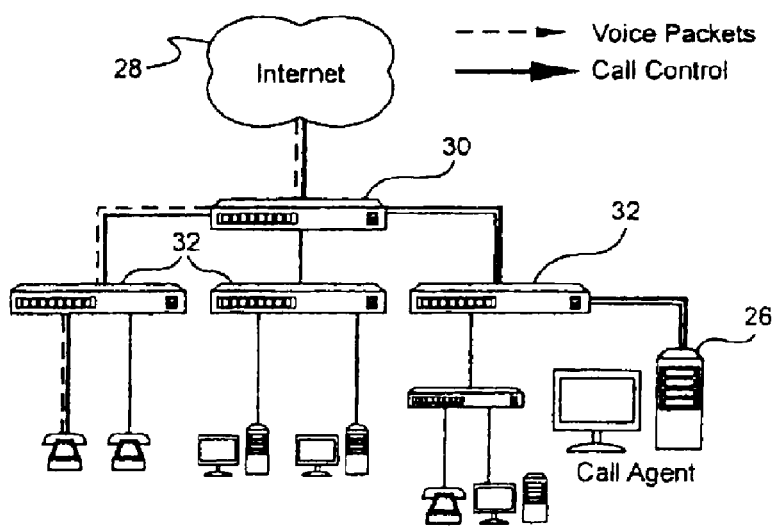
FIG. 4 is a block diagram of a simple VoIP network in which a call agent is used.
Figure 5:
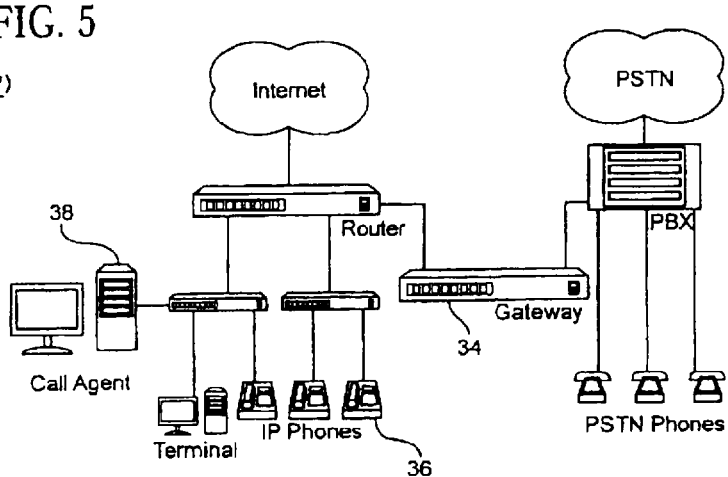
FIG. 5 is a block diagram of a hybrid VoIP and Public Switched Telephone Network (PSTN) network.
Figure 6:
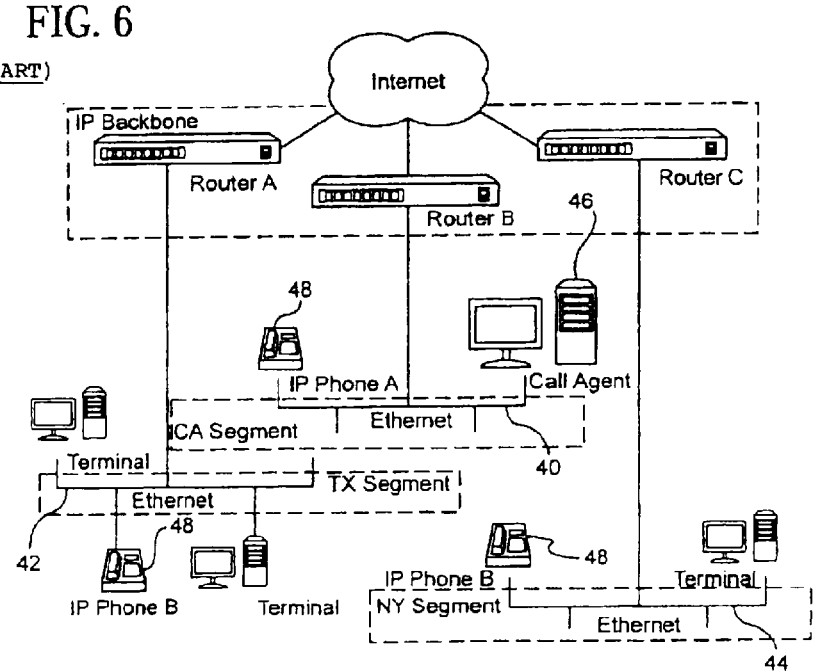
FIG. 6 is a block diagram of a distributed VoIP network.
Figure 7:
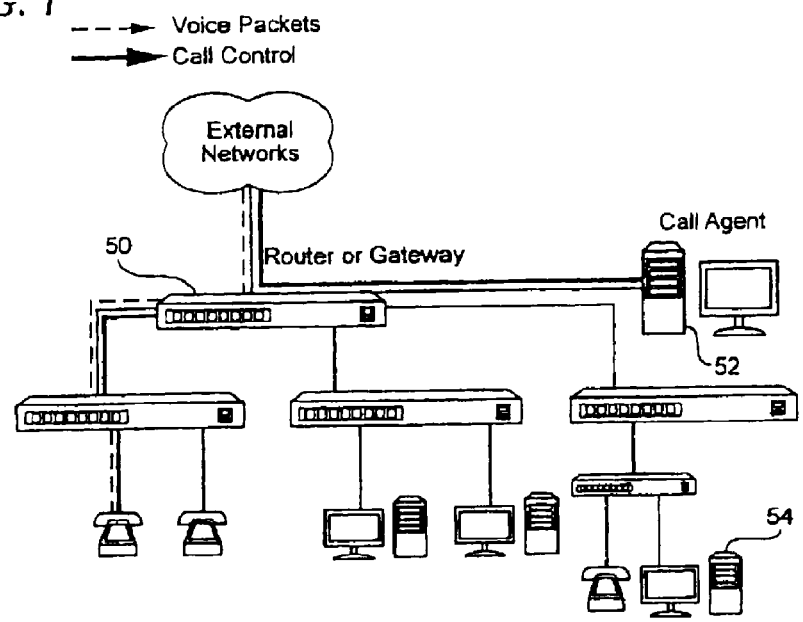
FIGS. 7 and 8 are block diagrams of VoIP networks illustrating data flow through the network.
Figure 8:
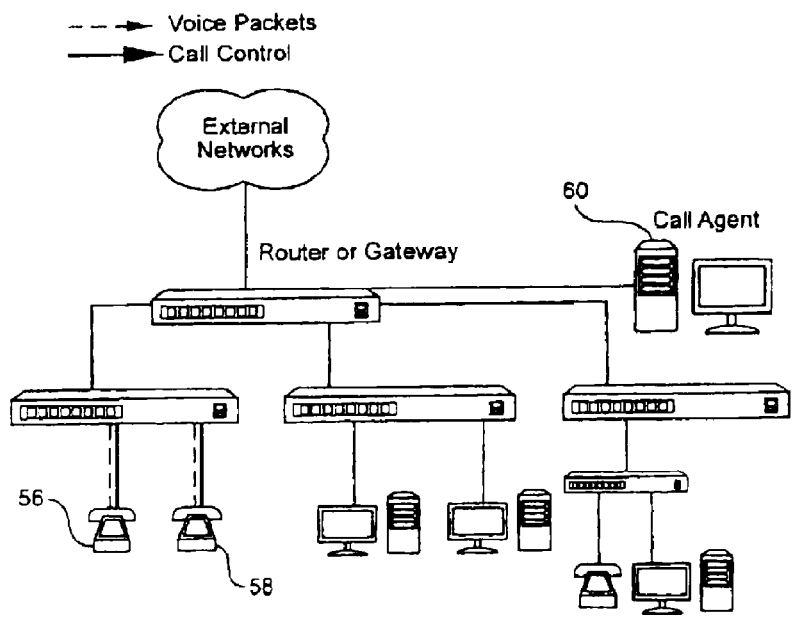
Figure 9:
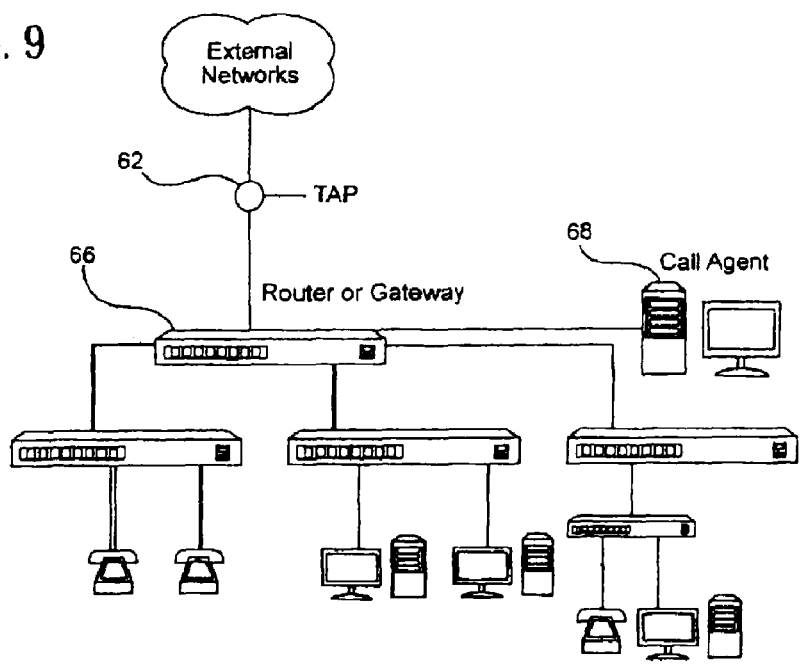
FIG. 9 is a block diagram of a VoIP network illustrating a tap positioned to monitor trunk activity on the network.
Figure 10:
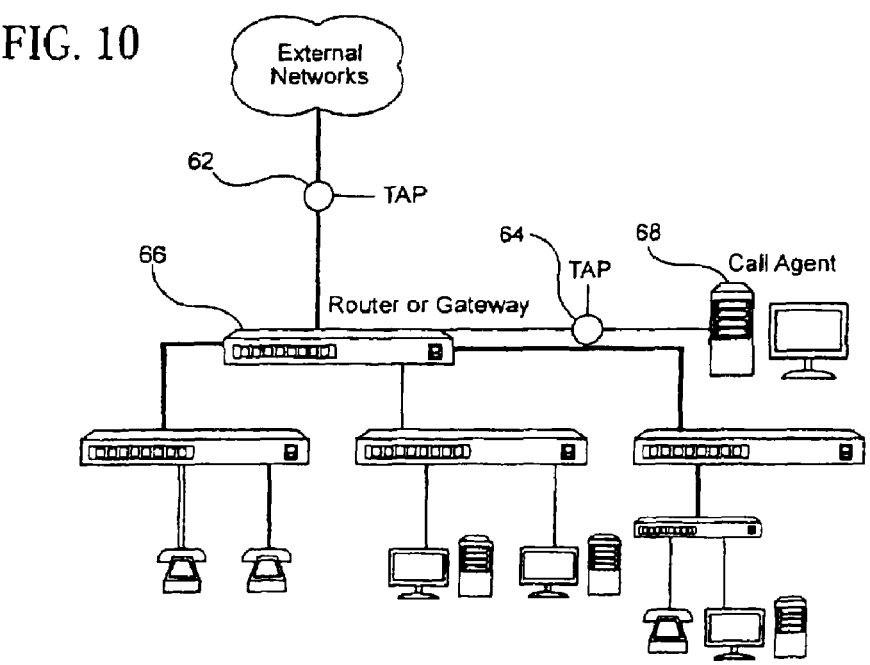
FIG. 10 is a block diagram of a VoIP network illustrating a tap positioned to monitor agent activity on the network.

Unlike PSTN recording, VoIP recording, in general, the type of information required by the call recording application determines the location of the tap. Many call recorders record only calls entering or leaving the local telephone network. In FIG. 9, a tap point 62 is located between a Router or Gateway and the external VoIP network. This is commonly referred to as trunk recording. Other call recording applications need to monitor agent behavior as well. In FIG. 10, a tap 64 is located between the local PBX and agent phones, so that local call control information passes into the recording application.

FIG. 9 illustrates trunk recording, in which the tap point 62 is positioned internally on the network directly behind an outside facing Router 66. All voice traffic entering or leaving the local phone network is recorded through this point. Call control information passing between the external network and a Call Agent is captured. Internal calls (agent-to-agent calls) and call control passing from the phones to the Call Agent 68 is not captured.

FIG. 10 enables the call recorder to monitor agent behavior. The tap 64 is placed between the Call Agent 68 and switch leading to IP phones. In this scenario, all voice traffic leaving and entering the local network is recorded, as well as all call control information. Agent behavior is monitored through call control information passing from the IP phones to the Call Agent 68. Voice packets passing between IP phones are not captured.

3.1 Local (Agent-to-Agent) Recording

Some call monitoring applications record all phone conversations including agent-to-agent traffic. As discussed above, this type of recording becomes more complicated in a VoIP environment. When a call is placed to another phone on the local network, only the call control information passes to the Call Agent. The voice packets are passed directly between the two IP phones. If the two phones are connected to the same switch, voice packets never leave that segment of the network.

If local recording is required, the tap points must be distributed throughout the network. One option would be to install taps on each individual phone on the network. Though 100% effective, this is expensive. A second option is to tap the span or mirror port of each switch. Here, a recording application captures both call control and voice packets for each phone. Unfortunately, span ports support data flow at the rate of 100 mbs. Data is passing through the Ethernet at a rate of 100 mbs in both directions. This tap point reaches a bandwidth limit when the network operates at 50% capacity.

Figure 11:
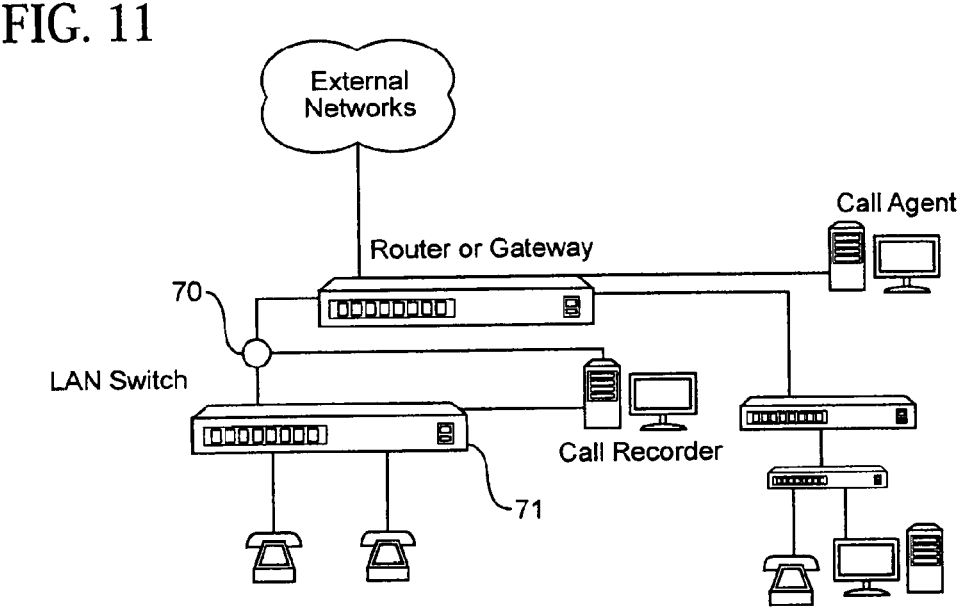
FIG. 11 is a block diagram of a VoIP network illustrating a tap positioned to monitor agent-to-agent activity on the network.

To address this limitation, the span port 71 on the LAN switch is preferably configured so that information only passes in one direction, as shown in FIG. 11. A high impedance tap 70 can then be installed on the Ethernet cable to capture data transmitted in the other direction. In this scenario, the recording application retrieves 100% of call control and voice packets for each IP phone connected to the switch.

3.1.1 Distributing a VoIP Call Recording System

The introduction of VoIP dramatically changes telephony architecture. Where conventional PSTN networks are deployed with a standard architecture, IP-based telephone networks are not. There are numerous ways to design a corporate network, and the same applies to telephone networks. If designed well, a single VoIP call recording system can be reused on another network with minimal development effort. Call recorders created with a modular design are the most flexible and provide the best long-term approach when planning a VoIP recording solution.

Figure 12:
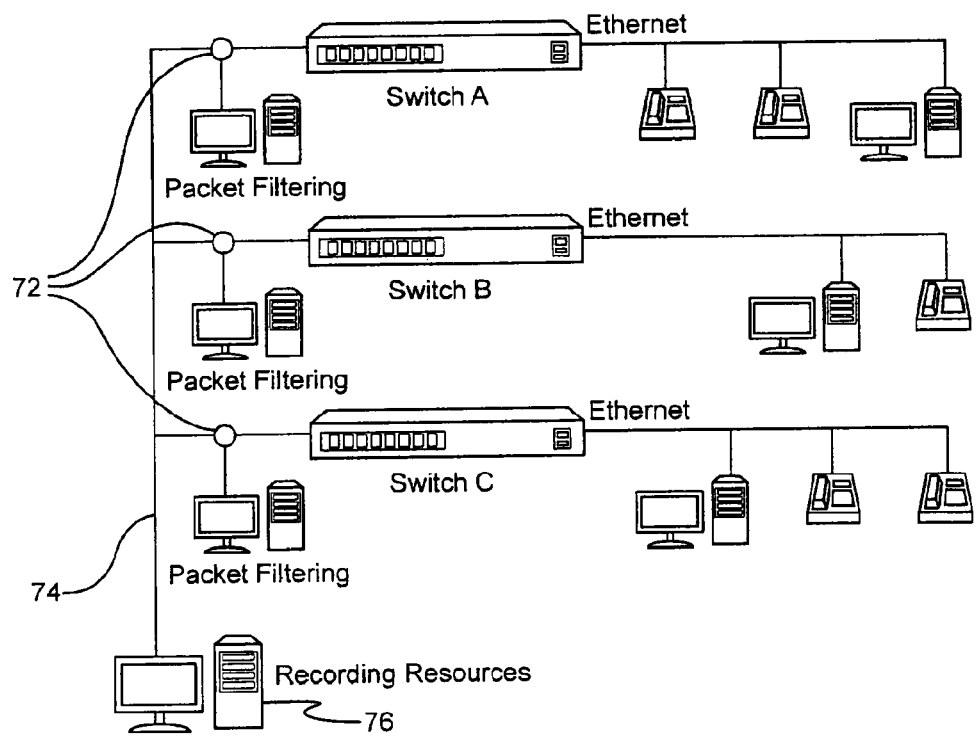
FIG. 12 is a block diagram of a distributed VoIP network showing centralized recording resources.
Figure 13:
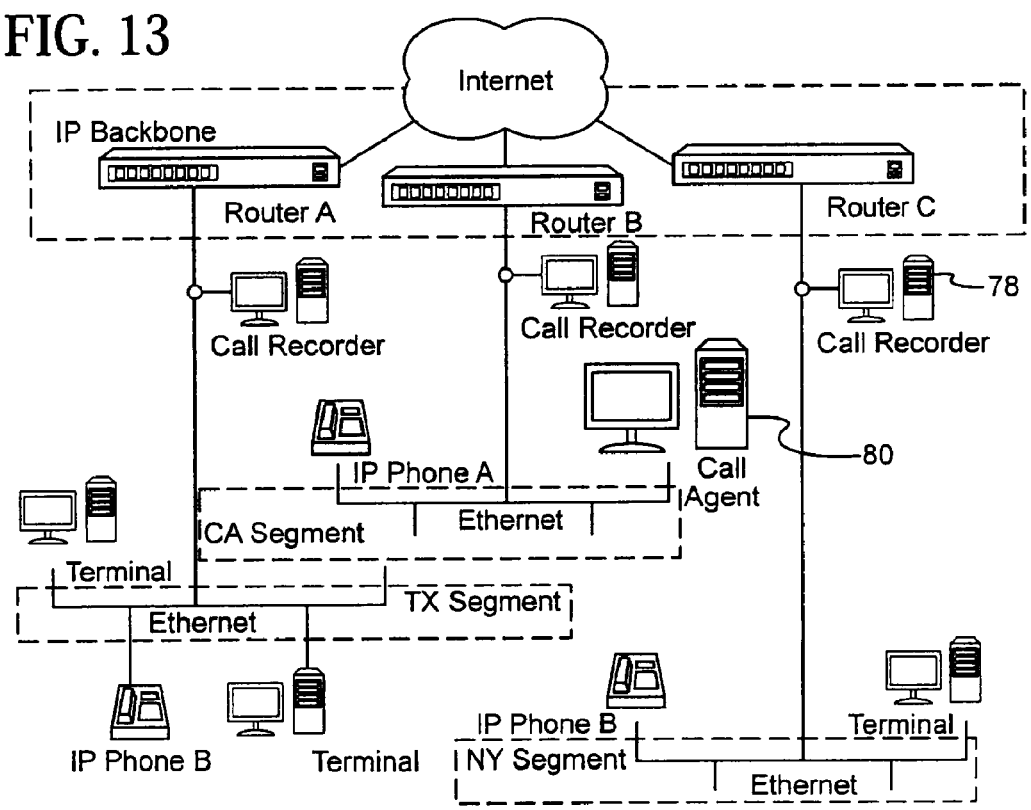
FIG. 13 is a block diagram of a distributed VoIP network illustrating localized recording resources.

FIGS. 12 and 13 illustrate two types of distributed VoIP networks. In FIG. 12, tap points 72 and packet filtering resources are distributed on the network. The filtered data is then passed via an internal IP network 74 to a centralized recording server 76. FIG. 13 shows a call recording system that is distributed throughout the VoIP network. All resources including tap points, decoding, packet filtering, and recording, are centralized at each site 78. Since the architecture of a VoIP network varies dramatically from location to location, the preferred solution is to design a modular call recording system. For example, a large corporation has three office segments controlled by a single Call Agent 80. Here taps are distributed throughout the three office segments and provide local packet filtering, decoding and recording resources.

There are two different options for tapping. The first option is to place the tap on the uplink of a switch. However, this method will not be able to support the peer-to peer call recording for all downstream stations since the peer-to-peer voice traffic will be routed inside the switch, instead of passing thru the tapping point. Recording peer-to-peer calls on the same switch preferably uses the second option. The second option uses the span port on the switch to duplicate the station traffic and pass the information to the recording system. Alternatively, if the span port is not acceptable, peer-to-peer recording can be accomplished by passive tapping on each station.

4.0 Architecture Overview of the Passive VoIP Recorder

Figure 14:
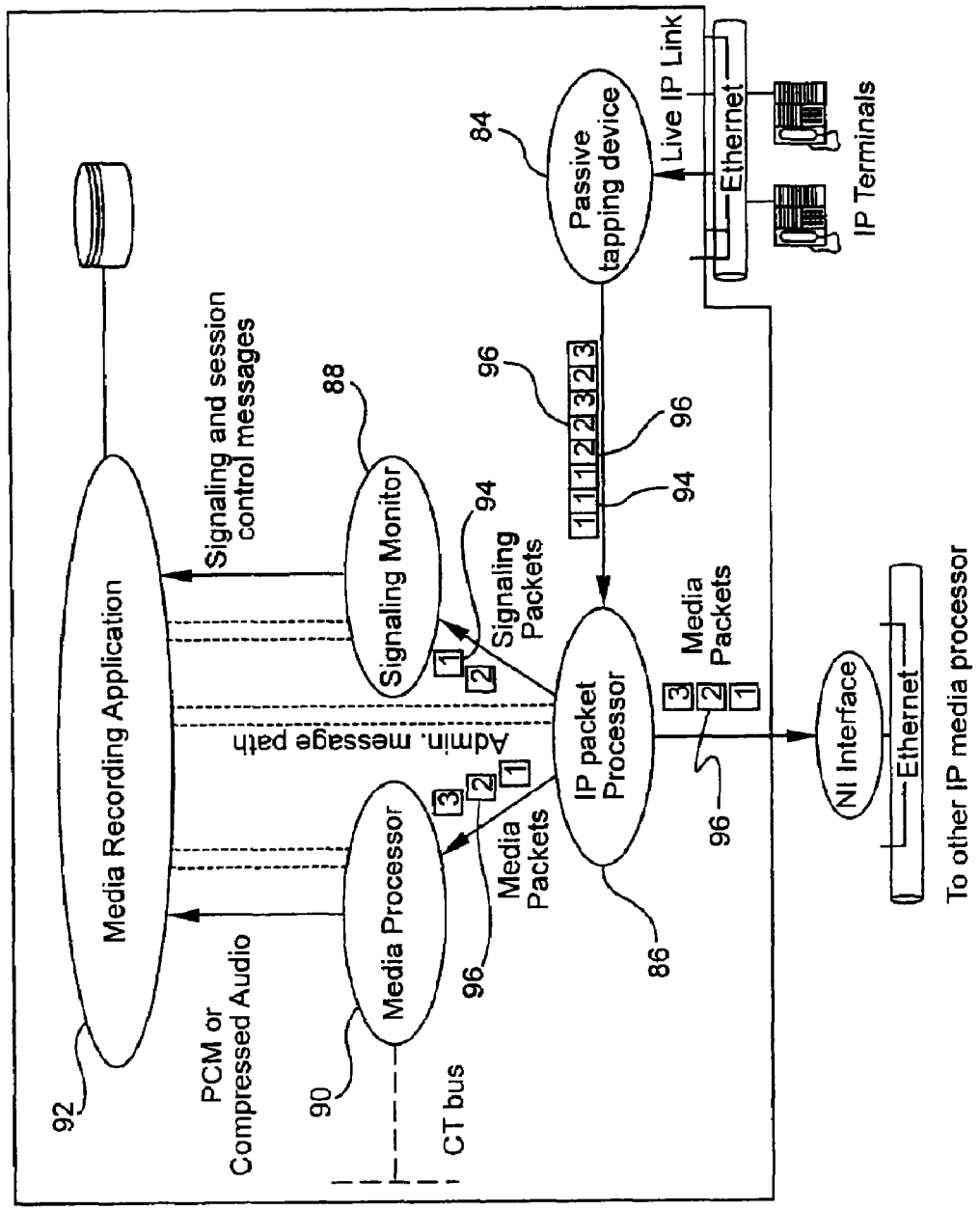
FIG. 14 is a top-level block diagram of the VoIP Call Recorder architecture formed in accordance with the present invention.

A detailed description of the VoIP call recorder formed in accordance with the present invention will now be discussed. A top-level block diagram of the VoIP Call Recorder 82 is shown in FIG. 14, which preferably includes five subsystems:

1. Passive tapping device 84: An external device that isolates the recorder from the live IP link. Both upstream and downstream data are forwarded to the recorder.
2. Packet Processor 86: All IP packets are sent to the Packet Processor 86 by the external tapping device. Packet Processor 86 discards all irrelevant packets and forwards useful packets to either the Signaling Monitor, and Media processor 90.
3. Signaling Monitor 88: Signaling Monitor 88 analyzes the contents of each signaling packet and monitors the call and session status. When a session on a call is established, Signaling Monitor 88 informs the Media Recording Application 92 to start to record.
4. Media processor 90: Media processor 90 extracts media contents from the IP packets and transcodes the media, which preferably includes voice and/or audio information, from the input format to a specified format, such as, but not limited to G.711, A-or mu-law PCM, linear PCM, G.723.1, G.727, G.722, G.729a/b, GSM610, GSM-MS, NetCoder, and Oki-ADPCM by algorithm and/or means well known in the art. The end product of the Media Processor 90 may be saved in a file or forwarded to the CTbus 181. Transcoding results in a substantial reduction in the amount of storage area required to save the information. 181. Transcode or transcoding in the context of this document refers to a procedure that converts media information from one format to another other format. In the method in accordance with the present invention, voice transcoding is implemented in two steps: voice is decoded into linear format that is then encoded into a second format.
5. Media Recording Application 92: This application coordinates the operation of the other subsystems and monitors the performance of the VoIP recorder.

Each of above subsystems preferably resides in either separate processes or systems, which are interconnected by a network, or incorporated into the same system.

4.1 Data Flow

The data flow preferably starts at the Tapping Device 84 where all IP traffic, both signaling and media data, is collected and forwarded to the Packet Processor 86. At the Packet Processor 86, different packets are redirected to different destinations. If the packet is a signaling packet 94, the packet 94 is forwarded to the Signaling Monitor 88. If the packet is a media packet 96, the packet is forwarded to the Media Processor 90.

The signaling packets 94 and media packets 96 are processed by the Signaling Monitor 88 and the Media Processor 90, respectively. The outputs from the Signaling Monitor 88 are preferably high-level call control information and session information. The call control information is used by a Session Service 100 of the Media Recording Application 92 to determine how to handle the call and to determine call and network statistics and analysis.

A call is defined herein as a logical association of connections between two or more endpoints over a network. A call is established or cleared on demand by either communicating entity. A connection is defined herein as an association of endpoints on a network for the purpose of transferring information over the network. A connection can be established or cleared on demand by either communicating entity.

Once a call is established on the VoIP network, a media session should also be established immediately. A media session is defined herein as a set of multimedia senders and receivers, and the data streams flowing from the sender to the receiver. An example of a session is a single RTP voice stream between two IP phones. A voice call preferably includes two sessions, one in each direction.

4.2 Control Flow

While data flow starts at the passive tapping device 84, goes thru the middle layers, 86, 88, or 90, and ends at the Media Recording Application 92, the control flow preferably proceeds in the opposite direction. That is, the control flow preferably starts at the Media Recording Application 92 to ensure that the high-level subsystem is ready before data arrives. For example, in an operation involving the Signaling Monitors 88, along with the Packet Processor 86, the Signaling Monitor 88 is configured before the Packet Processor 86 is configured.

5.0 Media Recording Application

The Media Recording Application 92 is a process that initializes and brings up the system, starts a recording session when a media session is established, and stops the recording when the session is cleared. The Media Recording Application 92 functionally interacts with both the Media Processor 90 and the Signaling Monitor 88. Administratively, the Media Recording Application 92 interacts with the Packet Forwarder 86 as well.

Figure 15:
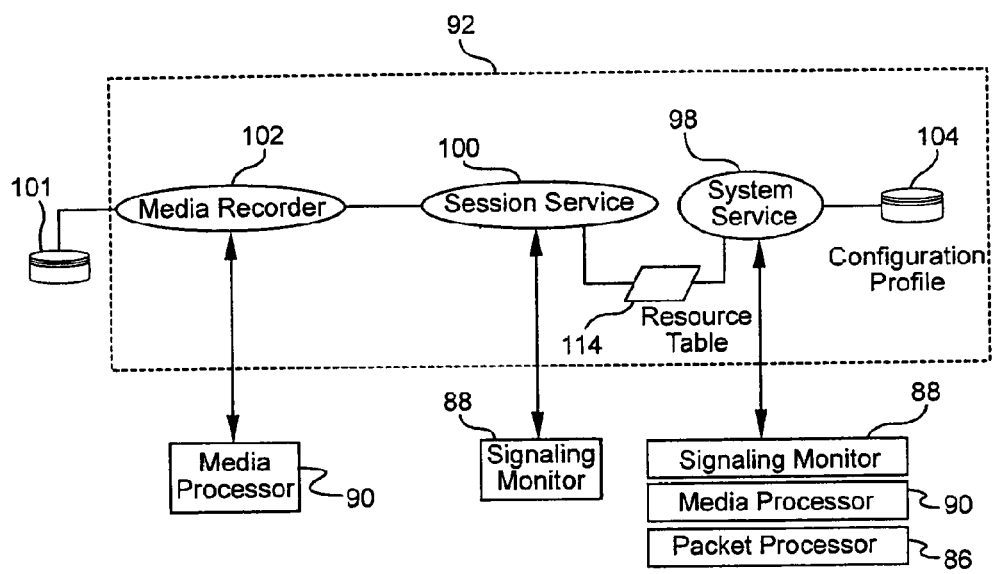
FIG. 15 is a block diagram of a Media Recording Application.

FIG. 15 is a block diagram of the Media Recording Application 92, which includes three functional components and one external mass storage device 101. The three functional components include System Service 98, Session Service 100, and Media Recorder 102.

5.1 System Service

Figure 16:
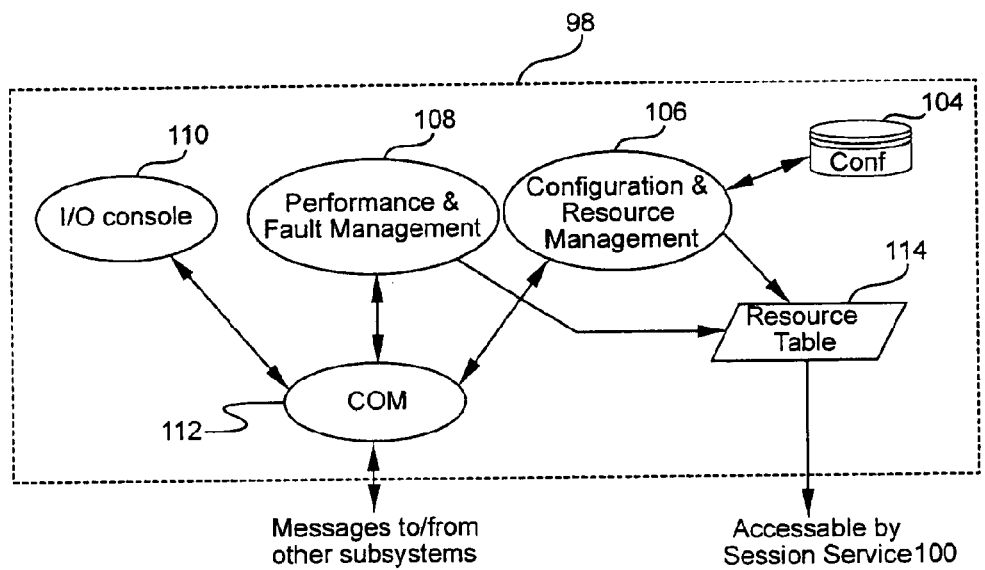
FIG. 16 is a block diagram of a System Service component of the Media Recording Application shown in FIG. 15.

The System Service component 98 is invoked at startup time. It is responsible for the operation, administration, and maintenance of the Media Recording Application 92. As shown in FIG. 16, the System Service component 98 preferably includes six elements: 1) Configuration and Resource Management Element 106, 2) Performance and Fault Management Element 108, 3) I/O Console Element 110, 4) COM Element 112, 5) a configuration profile stored in a mass storage device 104, and 6) a resource table 114.

5.1.1 Configuration and Resource Management

The Configuration and Resource Management Element 106 uses a Configuration Profile 104 to configure a Resource Table 114, which contains information about the Media Processor 90 capacity and its IP address. The Resource Table 114 is preferably readable by all components in the Media Recording Application 92.

The Configuration and Resource Management Element 106 also uses the Configuration Profile 104 to initialize a Packet Forwarding Table used by the Packet Forwarder 86 to forward the packets that contain selected protocol types and IP transport addresses (Transport address=IP address+port number).

The Configuration and Resource Management Element 106 preferably communicates with other subsystems or components through the COM element 112.

5.1.2 Performance and Fault Management

The Performance and Fault Management Element 108 is responsible for monitoring the performance of the VoIP recording system by monitoring the status of each subsystem, reporting alarm conditions or flags, and seamlessly redirecting traffic to a backup subsystem.

The Performance and Fault Management Element 108 preferably obtains system configuration information from the Resource Table 114, acquires subsystem status by sending queries to each subsystem, and creates a performance table.

The Performance and Fault Management Element 108 preferably communicates with other subsystems or components through the COM element 112.

5.1.3 I/O Console

The I/O Console Element 110 provides an interface between an operator and the Media Recording Application 92. In addition, it maps or translates the information to a common message format known to the message recipient.

The operator can use the I/O Console element 110 to:
1. reconfigure the Configuration Profile 104;
2. retrieve the Performance Report;
3. add or delete system resources;
4. change the Packet Forwarding Tables;
5. start and stop the system; and
6. restart a subsystem other than the Media Recording Application 92 subsystem.

Figure 17:
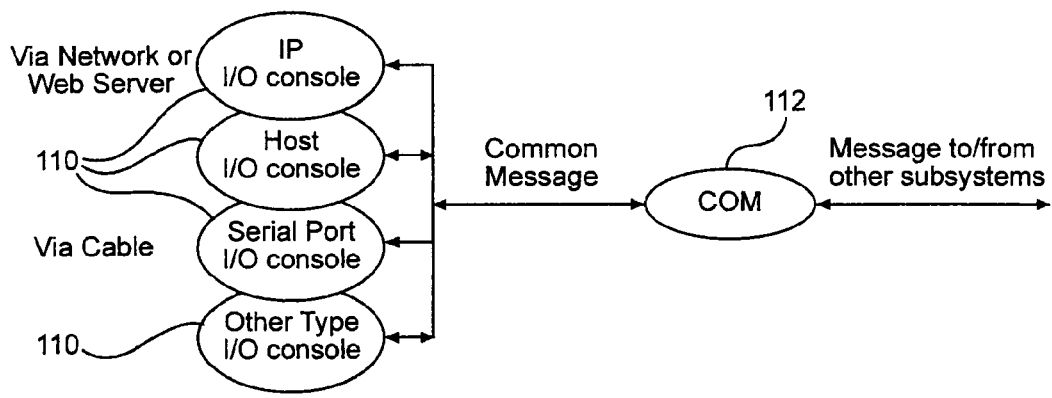
FIG. 17 is a block diagram showing communication paths between I/O Consoles and a COM element of the System Service component shown in FIG. 16.

The physical console can be either at the remote side or on the same host as the 10 Console element 110. As shown in FIG. 17, there can be more than one type of I/O console element 110 in the same system. At system startup time, the Configuration and Resource Management Element 106 preferably enables the I/O consoles 110 listed in the configuration table.

The I/O console element 110 preferably communicates with other subsystems or components via the COM element 112 shown in FIG. 17.

5.1.4 COM

The COM Element 112 is considered to be a message messenger between the System Service 98 and the other subsystems shown in FIG. 16.

Unlike Session service 100 and Media recorder 102, each element of the System Service 98 can preferably communicate with more than one other subsystems (FIG. 15). For the purpose of maintaining consistency in the system architecture and simplifying maintenance, the COM element 112 is incorporated in the System Service 98.

Communication between the COM 112 and other elements of the System Service, 106, 108, and 110 is preferably provided thru function calls indicating a pointer pointing to where the destination, contents, and properties of the message are stored. Then COM 112 will package the information in a message and send it to the target subsystem.

5.2 Session Service

Based on the call and call status provided by the Signaling Monitor 88, the Session Service 100 shown in FIG. 14 preferably decides where to forward the session stream. The Session Service 100 will also call the Media Recorder 102 to begin recording. The Session Service 100 preferably:
1. Makes the decision for each call regarding whether the call needs to be recorded or ignored. The decision can be based on any one or more of the following conditions:
   a. matching caller ID;
   b. matching called number;
   c. any active call;
   d. matching destination IP and port address only;
   e. matching source IP and port address only;
   f. matching both source and destination IP and port address;
   g. matching either source and destination IP and port address; and/or
   h. degradation in call quality, as indicated by latent call setup analysis, dropped packet analysis, packet transport error analysis, and/or latency analysis.
2. Makes the decision on how to record each session when there are multiple concatenated sessions of a single call. The decision can be to either:
   a. record each session individually;
   b. record all sessions in one file; or
   c. selectively record sessions.
3. Informs the Media Recorder 102 of the session information including the session ID, IP transport address (IP address+port number) and the recording attributes. This message implies the start of recording.
4. Inform the Media Recorder 102 to stop recording when the session is ended.

Rather than having the Session Service 100 determine routing for each session, packet forwarding can be also be configured such that the packet forwarding is done automatically by the Packet Forwarder 86. This is preferably accomplished by setting an auto flag in the Configuration Profile 104. The System Service 98 will then assign a valid session ID in the IP table 162 via Session Service 100, which is discussed in further detail below.

5.3 Media Recorder

Upon receiving the Session Service 98 recording message, the Media Recorder 102 preferably begins to record by:
1. Instructing the Media Processor 90 to transcode and/or compress the media stream. Both session information (session ID and IP address) and recording attributes are also conveyed to the Media Processor 90.
2. Creating a process that opens a file, receives the compressed data from the Media Processor 90, and saves it to the file.

The Media Recorder 102 preferably instructs the Media Processor 90 to stop recording when instructed to do so by the Session Service 100.

6.0 Passive Tapping Device

The Passive Tapping Device 84 shown in FIG. 14 is used to electrically isolate the IP recorder from the live IP link. From the tapping device, all IP packets are duplicated and sent to the IP Packet Processor 86.

Figure 18:
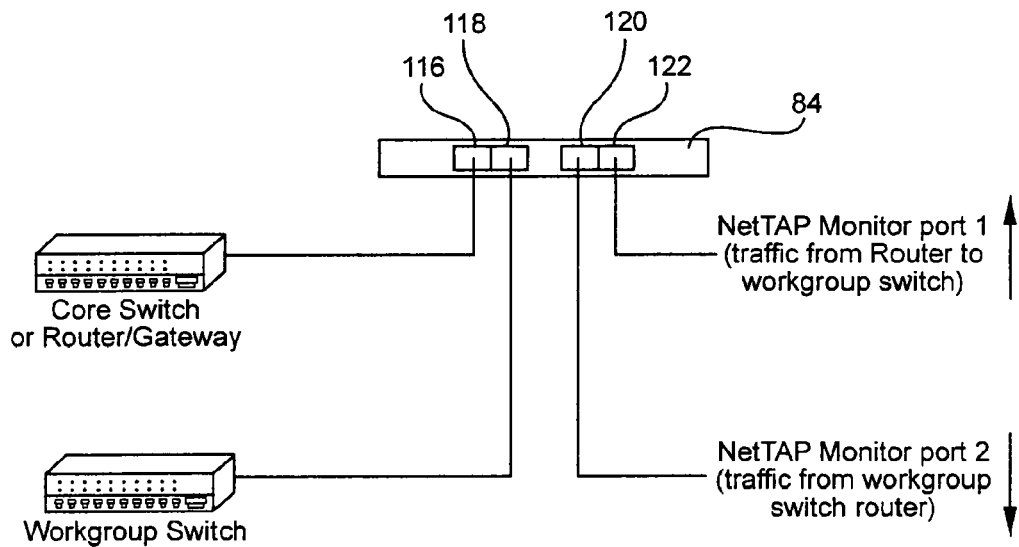
FIG. 18 is a block diagram showing the wiring of a Passive Tapping Device shown in FIG. 14.

The Passive Tapping device 84 preferably includes the following features:
1. passive tapping (high impedance) at, for example, 10 or 100 Mbps without interfering with live traffic or introducing a point of failure;

2. passing all traffic (including errors) from all network layers for comprehensive troubleshooting;

FIG. 18 shows a wiring diagram of the Passive Tapping Device 84. Each Passive Tapping Device 84 preferably includes four ports: Port A 116 and Port B 118 are used to connect the two endpoints on the IP link, and port C 120 and Port D 122 are used to send replicas of the IP packets received from Port A and Port B, respectively.

6.1 Internal Circuits

The passive tapping device 84 preferably includes two identical internal circuits 124, 126. Each circuit 124, 126 includes two physical ports: one port is used to receive IP packet from the IP link (Port A 116 and Port B 118 in FIG. 19) and the output port (Port C 120 and Port D 122) is used to send the copied signal to the monitor port of the IP recorder.

Figure 19:
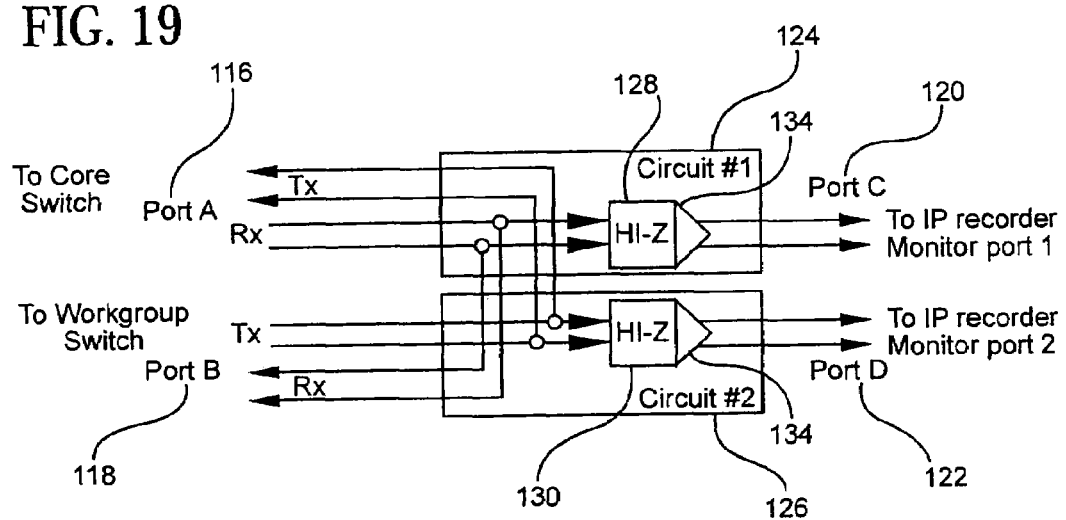
FIG. 19 is a block diagram of circuits in the Passive Tapping Device shown in FIG. 14.

Each circuit also contains a high impedance input network 128, 130 that preferably isolates the circuit from the IP link and a differential op amp 132, 134 that repeats the input signal. Each input signal is also routed, before the input network, to the other circuit as the output signal of the second circuit as shown in FIG. 19.

Figure 20:
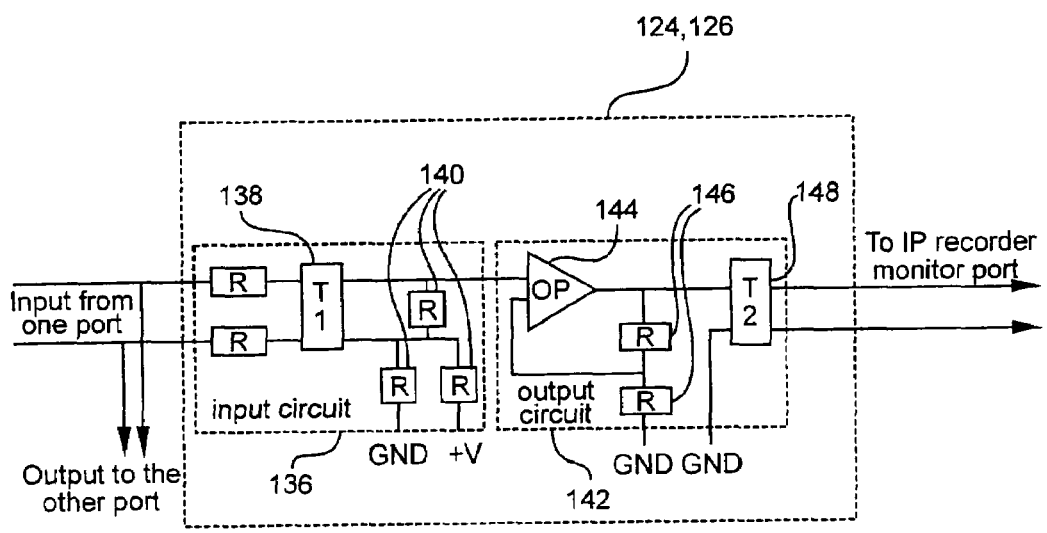
FIG. 20 is a simplified schematic diagram of one of the circuits in the Passive Tapping Device shown in FIG. 14.

As shown in further detail in FIG. 20, each circuit preferably includes two stages. An input stage 136 includes a transformer T1 138 and a resistive network 140 to isolate the output stage from the IP link. An output stage 142 includes an operational amplifier 144 and a resistive network 146 to repeat the input signal at the output of the operational amplifier 144. The output signal of the operational amplifier 144 is preferably provided to the IP recorder thru another transformer T2 148.

6.2 Data flow

Figure 21:
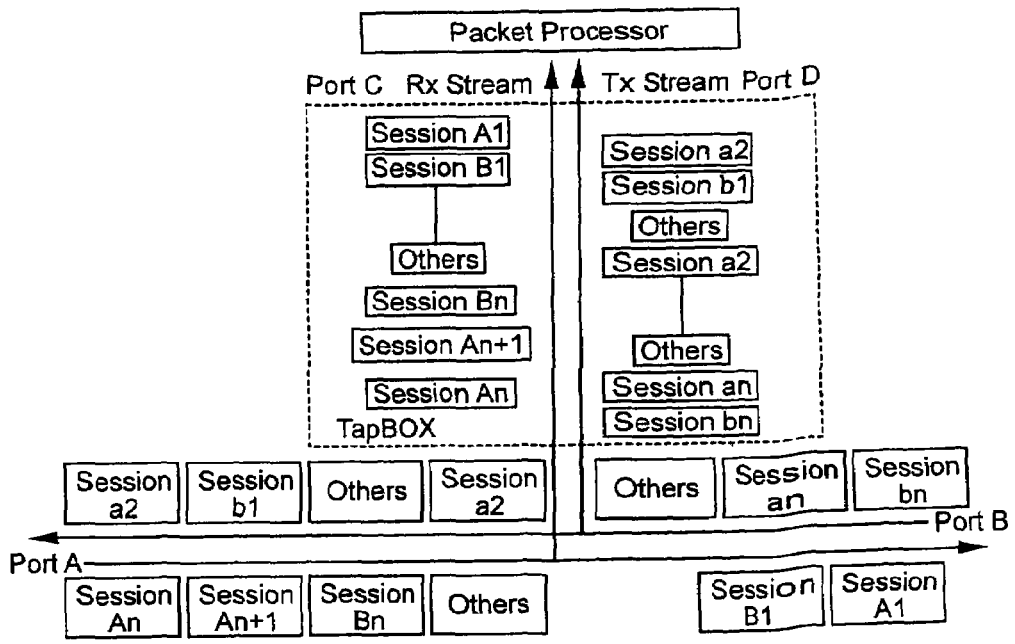
FIG. 21 is a block diagram showing data flow through the Passive Tapping Device shown in FIG. 14.

The Passive Tapping Device preferably inspects packets on the IP link in each direction (Ports A and B) and repeats the same packet as it receives on the output Ports C and D. FIG. 21 illustrates the data flow in the Passive Tapping Device 84.

The packets received on Port A are preferably directed to output Port B and regenerated thru the internal circuit to Port C. Similarly, the packets received on Port B are preferably directed to output Port A and regenerated thru the internal circuit to Port D. There is preferably no storage between ports A and C, and ports B and D.

7.0 Packet Processor

Figure 22:
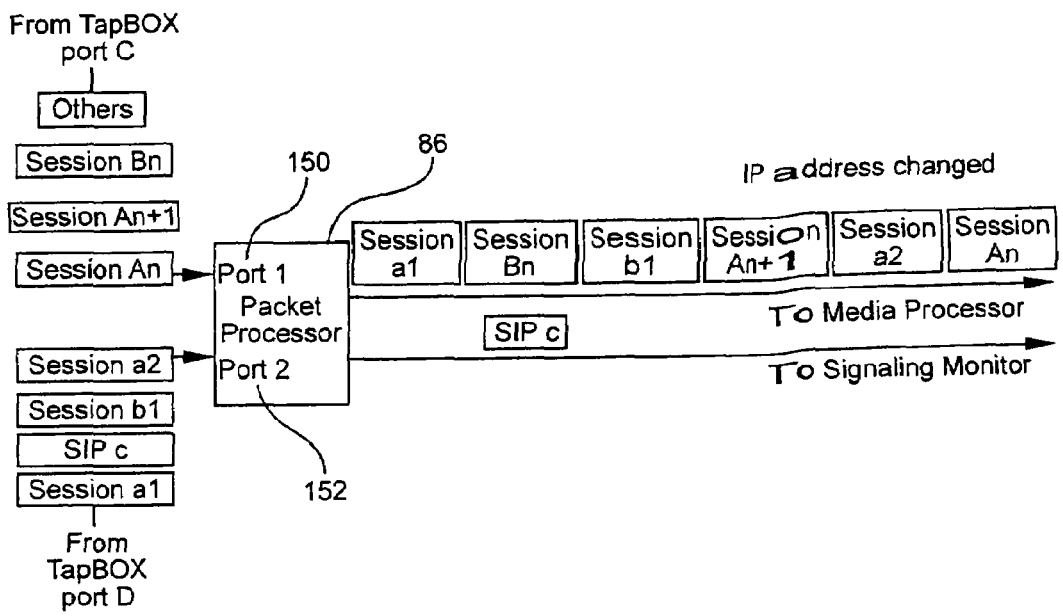
FIG. 22 is a block diagram showing the inputs and outputs of the Packet Processor shown in FIG. 14.

The purpose of the Packet Processor 86 is to redirect the useful packets on the Passive Tapping Device 84 and discard all others. In order to achieve this task, Packet Processor 86 preferably examines all received packets from the Passive Tapping Device and uses the IP and/or RTP headers to make a decision on each of the packets. Referring to FIG. 14, the IP packets 94, 96 received packets can be either a signaling packet 94 or a media packet 96. FIG. 22 illustrates the inputs and outputs of the Packet Processor 86. There are two data input ports on the left side of the diagram 22, Port 1 and Port 2. All IP packets from both Port 1 and Port 2 are processed in the Packet Processor 86. Relevant packets (those packets whose IP transport address has been registered in the IP address table, section 7.2) are forwarded to the Media processor 88, or Signaling Monitor 90, and all irrelevant packets are discarded.

Figure 23:
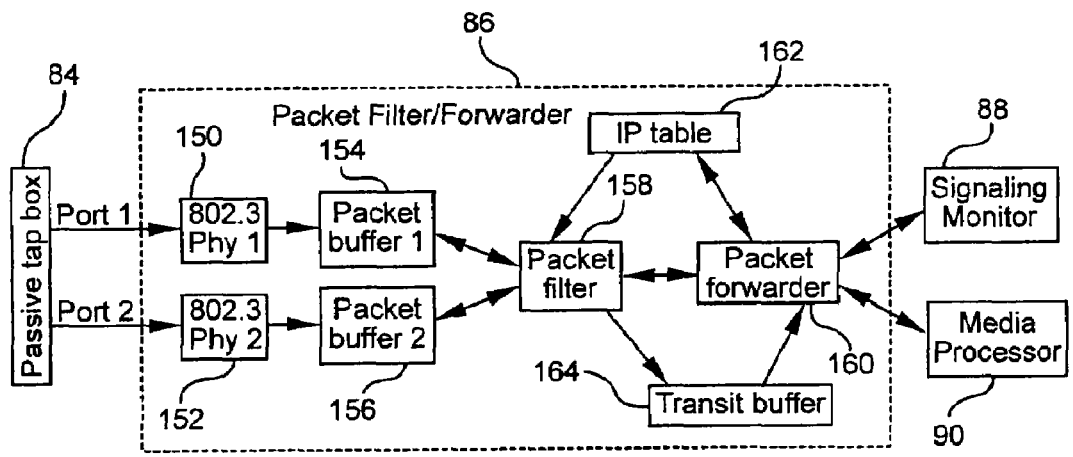
FIG. 23 is a block diagram of a Packet Processor shown in FIG. 14.

FIG. 23 shows a block diagram of the Packet Processor 86. Packets from both Port 1 and Port 2 are stored in the Packet Buffer 154 and 156 respectively. Useful packets are moved to the Transit Buffer 164 by the Packet Filter 158. Packets in the Transit Buffer 164 are forwarded to their final destination by the Packet Forwarder 160 later.

When a packet has an IP port number that indicates it is a signaling packet 94, the packet is then forwarded to the Signaling Monitor 88. The processing of signaling messages will be described in further detail below in the section entitled "Signaling Monitor".

Once a call is established and two sessions of the call are identified, the source and destination IP addresses and the port number of the IP packets are identified in each direction. IP packets with the correct IP address and port number are considered as valid media packets and routed to the appropriate Media Processor 90. The Media Processor 90 is preferably either a local DSP resource or a remote DSP resource on the network. The Media Processor 90 is described in further detail below in the section entitled "Media Processor".

7.1 802.3 Phy/MAC device 802.3 Phy/MAC device provides the physical interface to the passive tapping device 84 and performs the following 802.3 MAC functions:

1. Strips off incoming frame's preamble;
2. Discards incoming collided frames;
3. Detects incoming frame CRC error;
4. Detects received frames that are too long or too short; and
5. Presents data to Packet Buffer 1 and 2 when an error-free frame is received.

Each port of the Packet Processor 86, Port 1 and Port 2, preferably includes one 802.3 Phy/Mac 150, 152 device directly connected to the cable. Each 802.3 Phy/Mac device 150, 152 is configured to accept all error-free packets (in promiscuous mode—a mode which ignores the destination address of the packet) and pass the received error-free packet into a corresponding packet buffer 154, 156. The packets from both ports are preferably placed in packet buffers on a first-come-first-served basis. The interface with packet buffer will be described in section 7.3.1.

7.2 IP table

The IP table 162 is a list of existing sessions identified by a Session ID, IP addresses and port numbers, along with information that identifies the forwarding location (IP Addresses and port numbers). The Packet Filter 158 uses the IP Table 162 to determine whether a packet should be forwarded or discarded. The Packet Forwarder 160 uses the IP Table 162 to determine where to send the packet. The Packet Forwarder 160 is responsible for the maintenance of this table.

Table 1 illustrates how the IP Table 162 is used at different call stages:

TABLE 1

| Session ID | Destination IP address | Destination Port | Forwarding IP | Forwarding port |
|---|---|---|---|---|
| Determines who requests the forwarding. It is | Used to filter invalid packet. Determine when a | Used to filter invalid packet. Determine when a | To be used to substitute the original destination | To be used to substitute the original destination |

TABLE 1-continued

| Session ID | Destination IP address | Destination Port | Forwarding IP | Forwarding port |
|---|---|---|---|---|
| assigned by the singaling monitor when a session is established or when a signaling session is activated. | session is established | session is established. For signaling session, it may be configured | IP address in the out going packet | port number in the out going packet |

7.3 Packet Buffers 1 and 2

Figure 24:
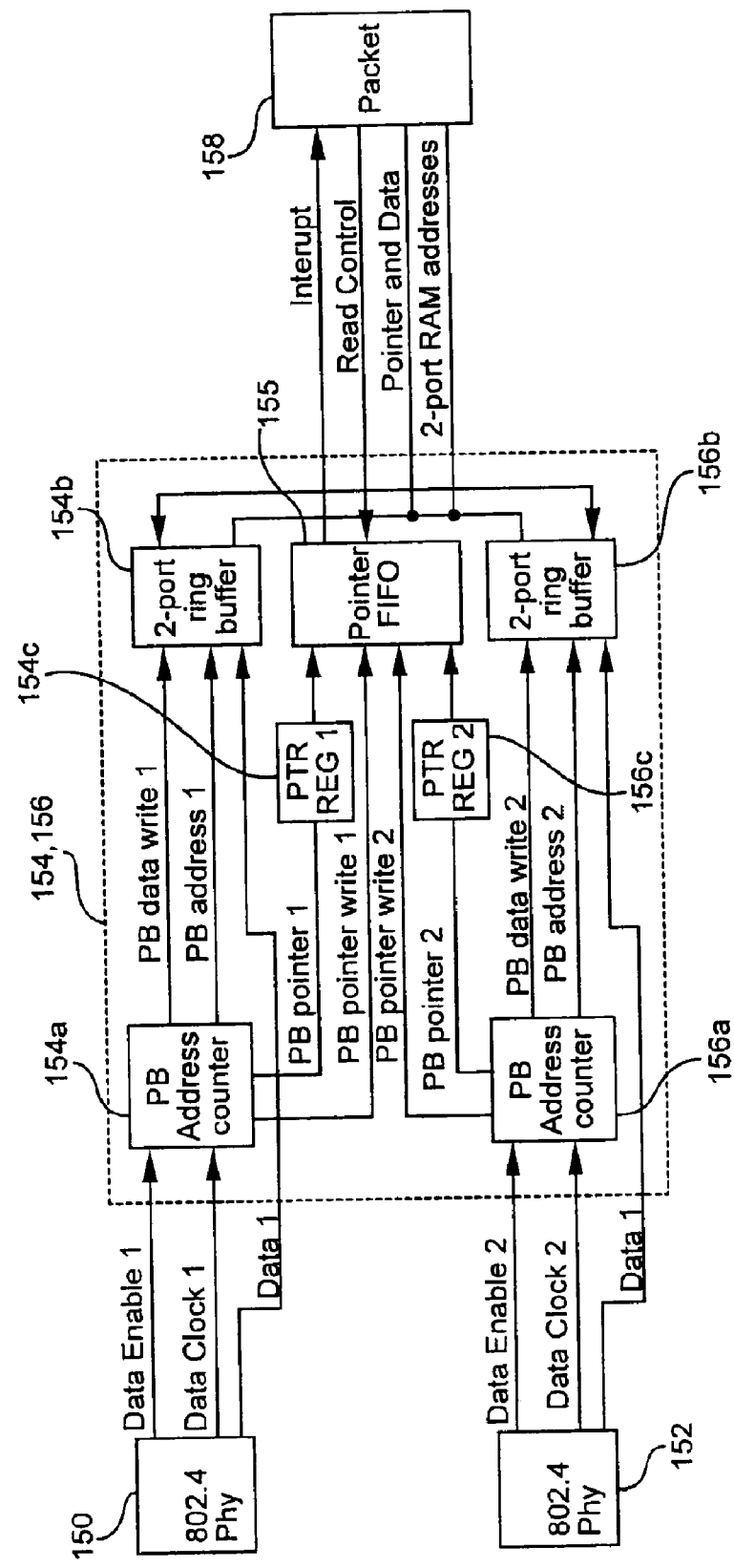
FIG. 24 is a more detailed block diagram of a Packet Buffer of the Packet Processor shown in FIG. 23.

FIG. 24 shows a more detailed block diagram of the Packet Buffers 154 and 156. Packet buffers 1, 154 and 2, 156 are used to temporarily store the packets received by the 802.3 Phy, 150 and 152 respectively. All packets stored in the Packet Buffers are then examined by the Packet Filter. The packets selected in the IP Table 162 are preferably moved to transit buffer 159, others are discarded.

7.3.1 Interfacing with 802.3 Phy

As shown in FIG. 24, there are three interface signals between each pair of 802.3 Phy and Packet Buffer, which include a Packet Data Signal, Data Enable Signal, and a Data Clock Signal. Packet Data is assembled and transferred at byte boundaries from the 802.3 Phy to the Packet Buffer.

Figure 25:
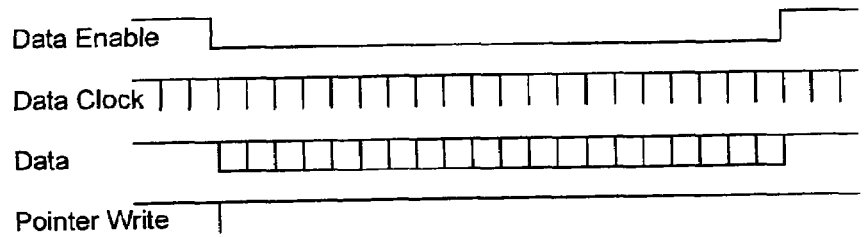
FIG. 25 is a timing diagram for the Packet Buffer shown in FIG. 24.

The Data Enable Signal is asserted when the 802.3 Phy, 150 or 152 has received a valid packet from Port 1 or Port 2, respectively. The Data Enable signal remains active until all data is transferred. The Data Clock Signal is a continuous clock pulse train signifying that a data byte is available for sampling at the clock edge (FIG. 25).

7.3.2 Process of the Packet Buffer

The architecture of the packet buffer 154 and 156 is illustrated in FIG. 24. Each Packet Buffer 154, 156 includes an address counter 154A, 156A, a 2-port Ring Buffer 154B, 156B, and a Pointer Register 154C, 156C, respectively. The size of the address counter 154A, 156A, the 2-port Ring Buffer, 154B, 156B and the Pointer Register 154C, 156C are application specific.

The address counter, 154A and 156A, is a binary counter triggered by the Data Clock Signal and enabled by the Data Enable Signal. The output of this counter 154a, 156a is used as the address of the 2-port Ring Buffer, 154B, and 156B, respectively. The counter is incremented at each clock after the data is written into the Ring Buffer when the Data Enable signal is asserted.

The 2-port Ring Buffer, 154B, 156B uses a dual port RAM. The Data Enable Signal and Data Clock Signal from the 802.3, 150, 152 control its "write" operation and the Packet Filter, 158 controls its "read" operation.

The Pointer Register 155 is used to temporarily hold the address pointing to the beginning of each packet stored in the dual-port RAM. When the Data Enable Signal is asserted, the output of the Address Counter 154A, 156A is immediately loaded into the Pointer Register 154C, 156C, respectively. The output of the Pointer Register is then saved into the Pointer FIFO 155 after each packet is saved in the respective 2-port Ring Buffer, preferably immediately after the Data Enable Signal changes.

Since there are two pointer registers and only one pointer FIFO, it is possible that both packet buffers 154 and 156 write to the FIFO simultaneously. An arbitration circuit is used to resolve the contention with the following rules:

1) do not interrupt the ongoing process; and
2) Packet Buffer 1 has the privilege over Packet Buffer 2 when both write simultaneously.

An interrupt pulse is generated by the Address Pointer FIFO 155 each time a new pointer is written into the FIFO. This interrupt pulse can be used to trigger the Packet Filter 158 process.

The contents of the 2-port Ring buffers, 154B, 156B, and Address Pointer FIFO, 155 are accessible by the Packet Filter 158. Furthermore, the status of the Address Pointer FIFO 155, such as FIFO full or empty, is also accessible by the Packet Filter 158.

7.4 Packet Filter and Transit Buffer

In IP architectures, the combination of the IP address and port number, sometimes the port number alone (called well-known port), can uniquely identify a session. For example, a packet with a port number of 80 belongs to an http session. A well-known port is used herein as a port number that is defined for a specific purpose and known to the public.

The Packet Filter 158 preferably uses the IP property described above and serves as a gateway that watches and discards all packets that do not have their IP address and port number registered in the IP Table, 162. Registered packets are forwarded to the proper destination by the Packet Forwarder 160. Table 2 illustrates the format of an IPv4 packet. The keys used for filtering by the Packet Filter 158 include Source IP Address, Destination IP Address, Source Port Number, and Destination Port Number. The Packet Filter 158 preferably reads the highlighted IP address and port number and compares it to what is in its IP address and port number list.

TABLE 2

Interfacing with Packet Buffer

| Version | HDLEN | TOS | Total Length in bytes | |
|---|---|---|---|---|
| IDentification | | | Flag | Fragment Offset |
| TTL | Protocol number | | Hearder Check Sum | |
| Source IP address | | | | |
| Destination IP address | | | | |
| Source Port Number | | | Destination Port Number | |

▨ Keys used for packet filtering by filter

Packet Filter 158 interfaces with Packet Buffer 154, 156 via three sets of signals: address, data, and interrupt. The address is used to access either the 2-port Ring Buffer or the Pointer FIFO. The data can be either the packet data in the 2-port Ring Buffer, 154b, 156b, or the data in the FIFO 155, or the status of the FIFO 155. The interrupt is generated by the FIFO 155 when there is unread data in the FIFO 155.

7.4.1 Process of Packet Filter

When a packet is available at the Packet Buffer 154, 156, the Address Pointer FIFO 155 alerts the Packet Filter 158 by sending an interrupt to the Packet Filter 158. The Packet Filter 158 reads the contents in the FIFO, which point to the beginning of the packet in the 2-port Ring Buffer and determines if the packet has been registered in the IP Table 162. The Packet filter 158 discards the packet if it is not registered in the IP table, which is how the packet filtering function is accomplished.

When a registered packet is identified, the Packet Filter 158 preferably moves the packet from the Packet Buffer 154, 156 to a Transit Buffer 164 and tags it with the session ID listed in the IP table 162. The Packet Filter 158 then calls the Packet Forwarder 160 with a pointer to where the packet is stored in the Transit Buffer 162.

7.5 Packet Forwarder

The Packet Forwarder 160 is preferably responsible for forwarding packets to destinations specified in the IP table 162.

7.5.1 Interfacing with Signaling Monitor and Media Processor

The Packet Forwarder 160 preferably includes similar interface mechanisms for both the Signaling Monitor 88 and the Media Processor 90. When the Signaling Monitor 88 is ready to accept the signaling packet, it preferably sends a registration message to the Packet Forwarder 160 indicating the session ID, destination port number, and IP port address of the signaling packet. This message is preferably sent once in the beginning of the operation. In order to receive the packet, the Signaling Monitor 88 preferably calls a callback function (referenced to the session ID) to the Packet Forwarder 160 such that the Forwarder 160 knows the Signaling Monitor 88 is ready for the data. The callback function is preferably called for each packet. The subsequent callback function call implies that the memory used in the last call can be released (by the Packet Forwarder 160). Signaling Monitor uses an unique Session that is different from the Media Session.

The same scenario applies to packet transfers between the Packet Forwarder 160 and the Media Processor 90. The Media Processor 90 preferably registers with the Packet Forwarder 160 to enable the session and uses a callback function to retrieve the data.

There is no restriction regarding the number of Signaling Monitor 88 or Media Processor 90 that can register a session and request a packet. This provides support for multiple Signaling Monitors (having, for example, different signaling types) and Media Processors (having, for example, different media types).

It is to be noted that the Packet Forwarder 160 is responsible for updating the IP table when a Signaling Monitor 88 or a Media Processor 90 registers/un-registers the session.

7.5.2 Interfacing with Packet Filter

There are preferably two messages provided between the Packet Filter 158 and Packet Forwarder 160. The Packet Filter 158 sends a message to the Packet Forwarder 160 providing the session ID and pointer to the packet when a valid packet is available. The Packet Forwarder 160 sends a message indicating which memory can be released after either the Signaling Monitor 88 or Media Processor 90 requests the next packet.

7.5.3 Termination of a Media Session

A media session can preferably be terminated at any time by the Session Service 100. Session Service 100 will inform Media Recorder 102 of the session termination, and the Media Recorder 102 will in turn send a message to the Media Processor 90 to stop the recording session. The Packet Forwarder 160 will preferably be informed by the Packet Server 168 of the session termination and thus clear the session entry in the IP table 162 first. If there is any packets left in the transit buffer for the session, a failure message is preferably returned to the Media Processor 90. Meanwhile, the Packet Filter 158 will be informed of the session termination and thus, preferably discards all undelivered packets associated with the session (in the Transit Buffer 164).

8.0 Media Processor

The Media processor 90 receives media packets from the Packet Forwarder 160 and transcodes the media from the input format to a specified format, by means and/or algorithms well known in the art, for recording or transferring it to the CTbus 181.

Figure 26:
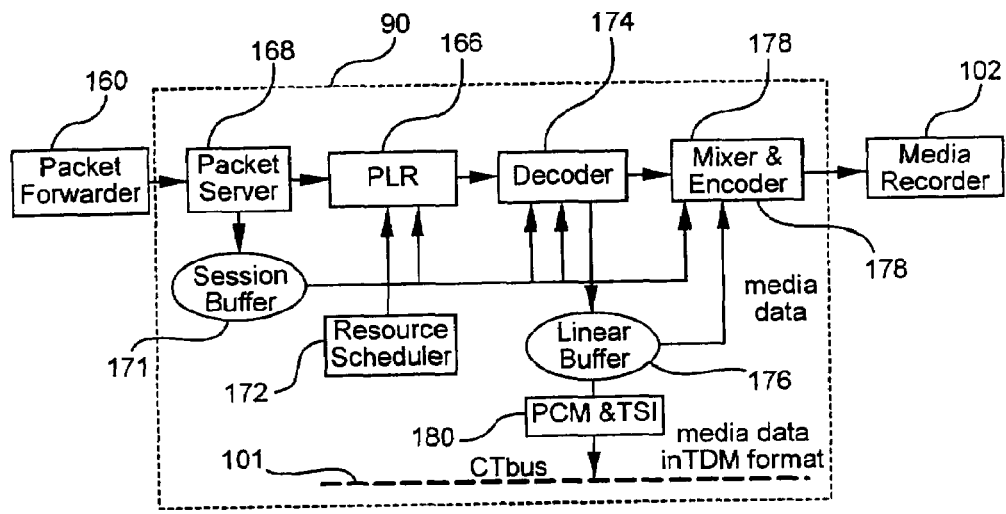
FIG. 26 is a block diagram of a Media Processor shown in FIG. 14.

FIG. 26 illustrates a block diagram of the Media Processor 90. Internally, the Media Processor 90 includes the following components:

1. Packet Server 168;
2. Packet Loss and Recovery (PLR) 166;
3. Resource Scheduler 172;
4. Decoder 174 and Linear Buffer 176;
5. Mixer and Encoder 178;
6. PCM & TSI 180; and
7. CTbus 181.

Externally, the Media Processor 90 interfaces with three other components, which include the Packet Forwarder 160 and Media Recorder 102. (see FIG. 14).

The following section describes the reception of media packets from the Packet Forwarder 160 (the input), processing of media packets, conversion of media format, and transmission of a processed media stream to the destinations (CTbus 181 and Media Recorder 102). FIG. 26 is a block diagram of the Media Processor 90.

8.1 Packet Server

The Packet Server 168 is a process that receives media packets from the Packet Forwarder 160 and places the payload (media data) of the packets into temporary storage, Session Buffer 171.

Figure 27:
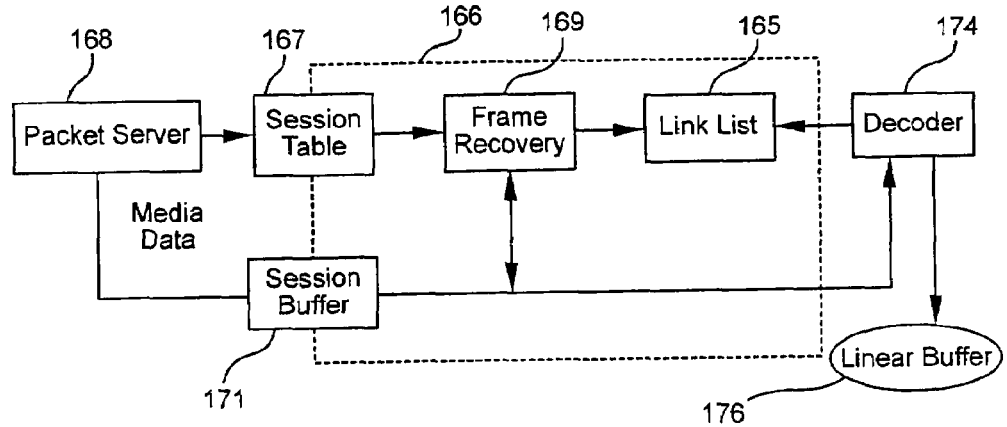
FIG. 27 is more detailed block diagram of a PLR of the Media Processor shown in FIG. 24.
Figure 34:
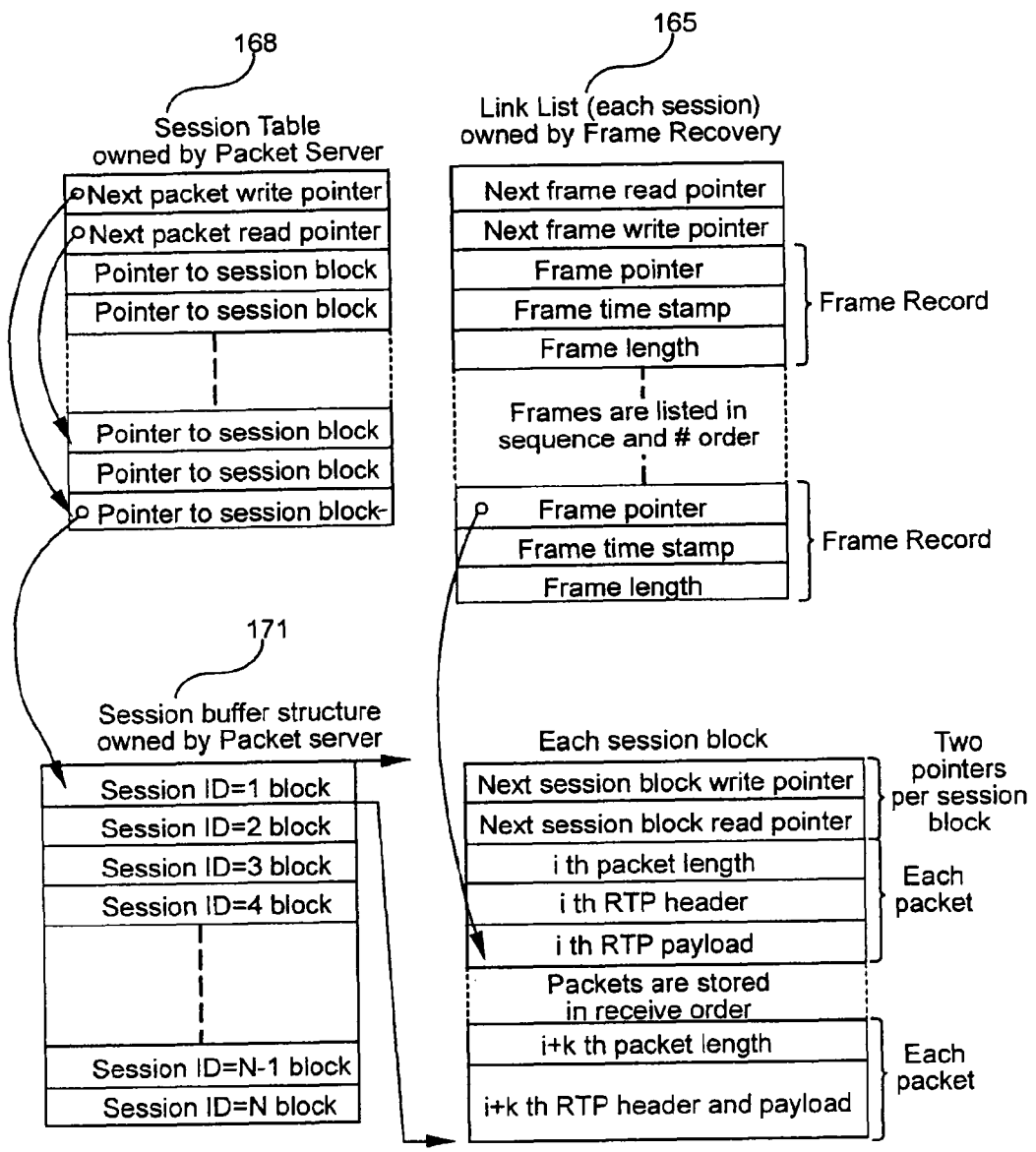
FIG. 34 is a diagram showing the structure of a Session table and a Session Buffer and the relationship between them.

After the media data is stored in the Session Buffer 171, Packet Server 168 updates the Session Table 167 where the session IDs for new packets are listed. FIG. 27 illustrates the interface between the Packet server 168 and the next component in the flow, PLR 166, and FIG. 34 illustrates the relationship between the Session Table 167, Session Buffer 171, and Link List 165.

8.1.1 Interfacing with Packet Forwarder

The Packet Server 168 preferably interfaces with the Packet Forwarder 160 via a callback function. The Packet Server 168 sends a message to Packet Forwarder 160 to register itself and enable the session and uses a callback function to retrieve the media data. The callback function is preferably called for the next packet each time a packet is delivered by the Packet Forwarder 160.

8.1.2 Process of Packet Server

When the media sessions on a call are established, the Media Recorder 102 sends a message to inform the Packet Server 168 of the establishment of a call (a recording session) and the session ID associated with the call. This message is preferably sent once in the beginning of each recording session. The Packet Server 168 preferably then registers a callback function (referenced by the session ID) with the Packet Forwarder 160 such that the Forwarder 160 knows the Packet Server 168 is ready to receive the media packet with the specified session ID. The callback function is preferably called each time a packet is delivered by the Packet Forwarder 160. Each callback function call implies that the memory used in the last call can be released.

8.1.3 Session Table and Session Buffer

At the beginning of each call session, Packet Server 168 preferably clears or resets the pointers in Session Table 167 and Session Buffer 171. The Session Buffer 171 is where all packets for the session are temporarily stored. The structure of the Session Buffer 171, as shown in FIG. 34, provides each session of total N sessions a memory block of size M bytes. The number N and M are configured when the system is initialized.

After a media packet is written into the Session Buffer 171, the Packet Server 168 writes the Session buffer address of this packet into the Session Table 167. Session Status FIFO serves two purposes: indicating that new packets have arrived and pointing to where the new packets are stored in the Session Buffer 171.

Each session block has two address pointers located at the beginning of the block. Following the pointers is the storage area where the packets for the session are stored as shown in FIG. 34. The two address pointers, "next write pointer" and "next read pointer", represent the address of the next packet location to be written to and read from respectively. The "next write pointer" is always preferably ahead of the "next read pointer". When the pointers are equal, it implies that there is no packet in the session buffer.

The Packet Server 168 updates the "next write pointer" after each packet is written into the Session Buffer 171. The PLR 166 compares both pointers and updates the read pointer when the packet contents are processed by the Decoder 174. The Session Buffer 171 is accessible by three components in the Media processor 90; Packet Server 168, PLR 166, and Decoder 174. Details of the PLR 166, and Decoder 174 are discussed below.

8.2 Packet Loss Recovery (PLR)

Figure 32A:
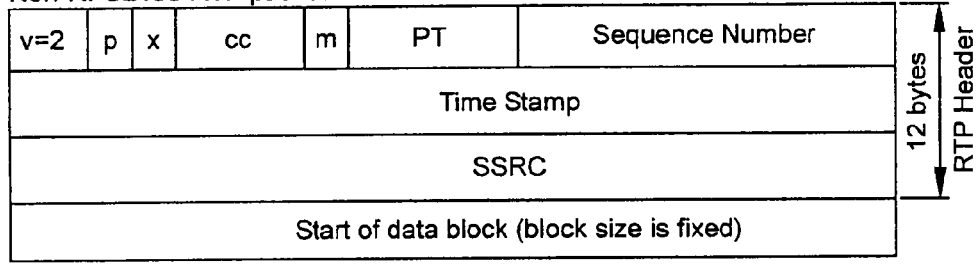
FIG. 32A and 32B show RTP reference formats.
Figure 32B:
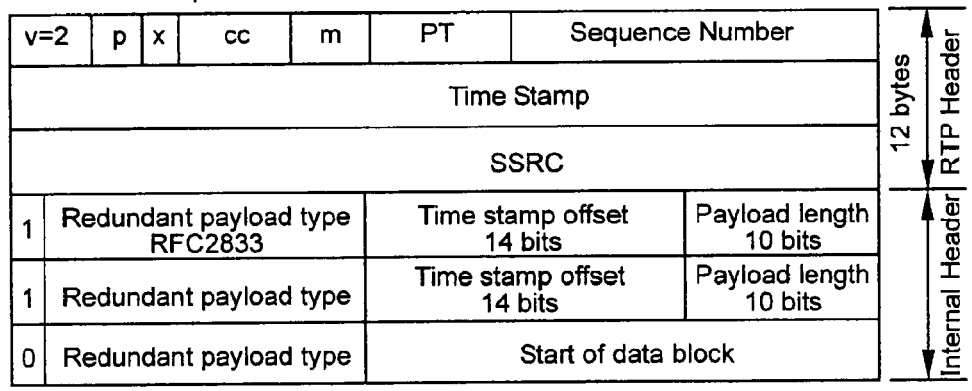

PLR 166 extracts media frames embedded in each media packet, replaces the missing frame with a silence frame, re-arranges the order of the frames according to the sequence number in the media packet, and presents the media frames to the Decoder 174. In addition, it manages the jitter buffer according to the delay variation on the network. It should be noted that a media packet is different from a media frame. A media frame is a unit of the media data. A media packet is a unit of transporting data. Per RFC2198, a media packet may contain multiple media frames and a media frame may be transported multiple times in subsequent media packets. RFC2198 is incorporated herein by reference. A non-RFC2198 compliant packet format is shown in FIG. 32A and a RFC-2198 compliant packet format is shown in FIG. 32B.

PLR 166 includes Frame Recovery 169 and Link List 165 components. The Frame Recovery component 169 handles all media frame recovery and sequencing, and manages the jitter. The Link List component 165 serves as an interface between the PLR 166 and the Decoder 174. FIG. 26 illustrates the relationship between the PLR 166 and other elements inside of Media Processor 90.

8.2.1 Frame Recovery

The Frame Recovery 169 process is triggered periodically by the Resource Scheduler 172 and ends either automatically when all new packets listed in the Session Table 167 are processed or when the Resource Scheduler stops the process.

When Frame Recovery 169 is started, it compares the write pointer and read pointer in the Session Table 167. When the write pointer is ahead of the read pointer, at least one new packet has been placed in the Session Buffer 171. If there is a new packet, Frame Recovery 169 evaluates the RFC2198 flag and the received packet's RTP sequence number to determine what to do next. It can be one of four possibilities as shown in Table 3:

TABLE 3

Figure 28:
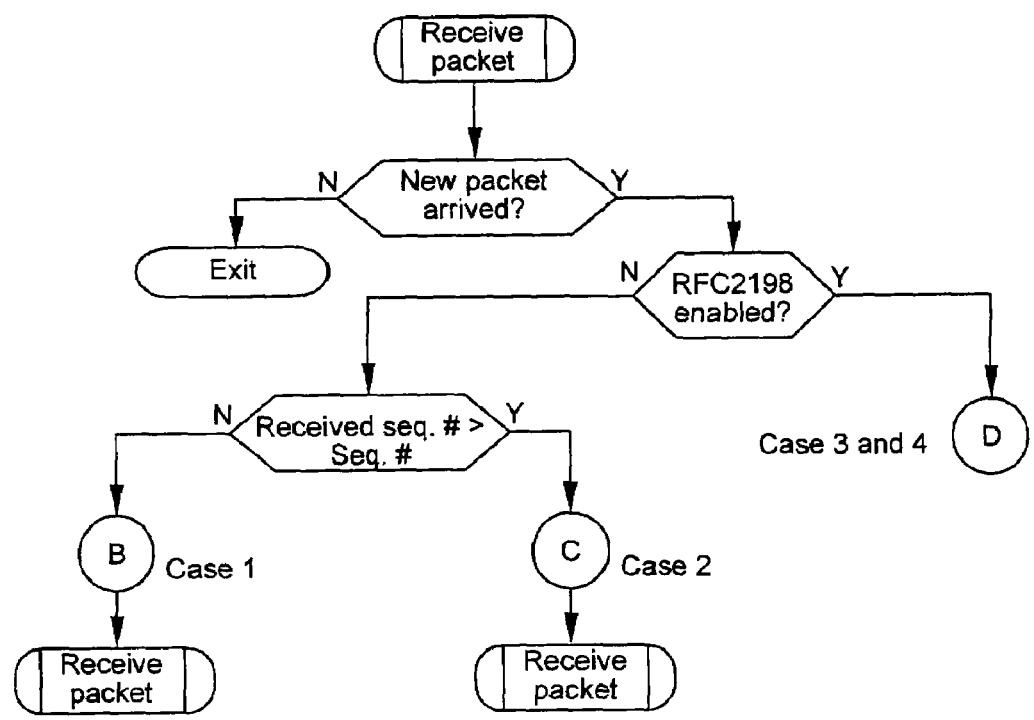
FIGS. 28, 29, 30, and 31 are flowcharts of a packet sequence number process performed by the PLR.
Figure 29:
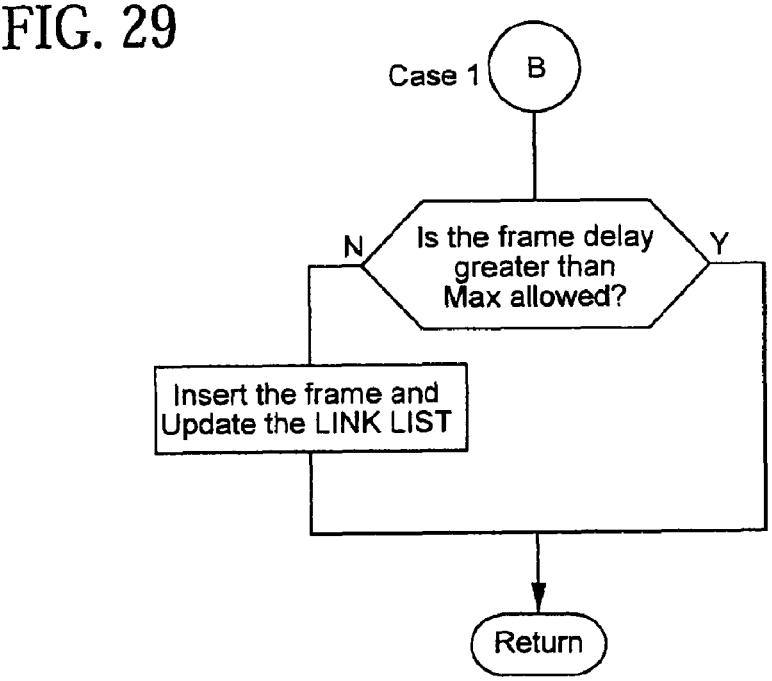
Figure 30:
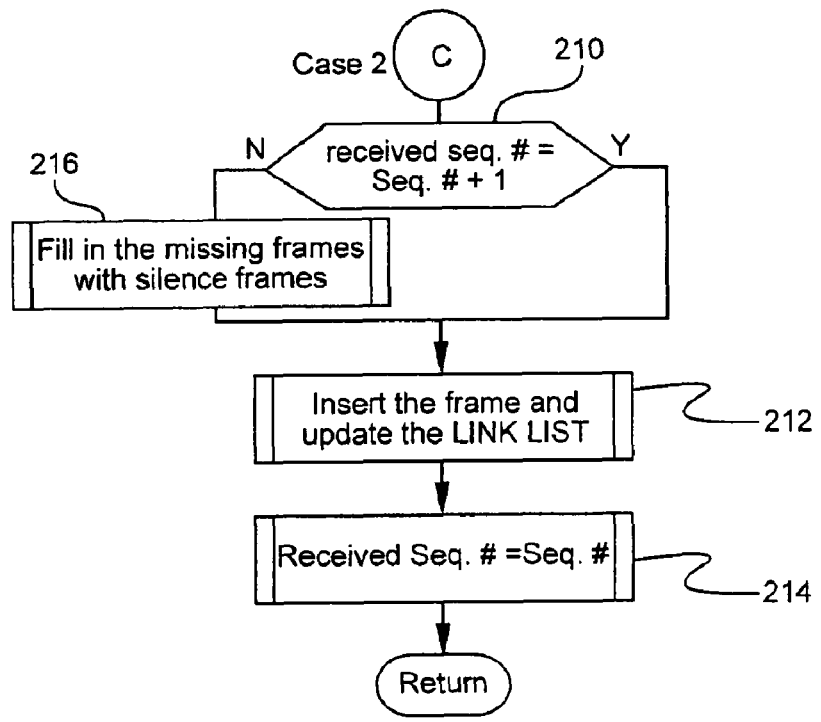
Figure 31:
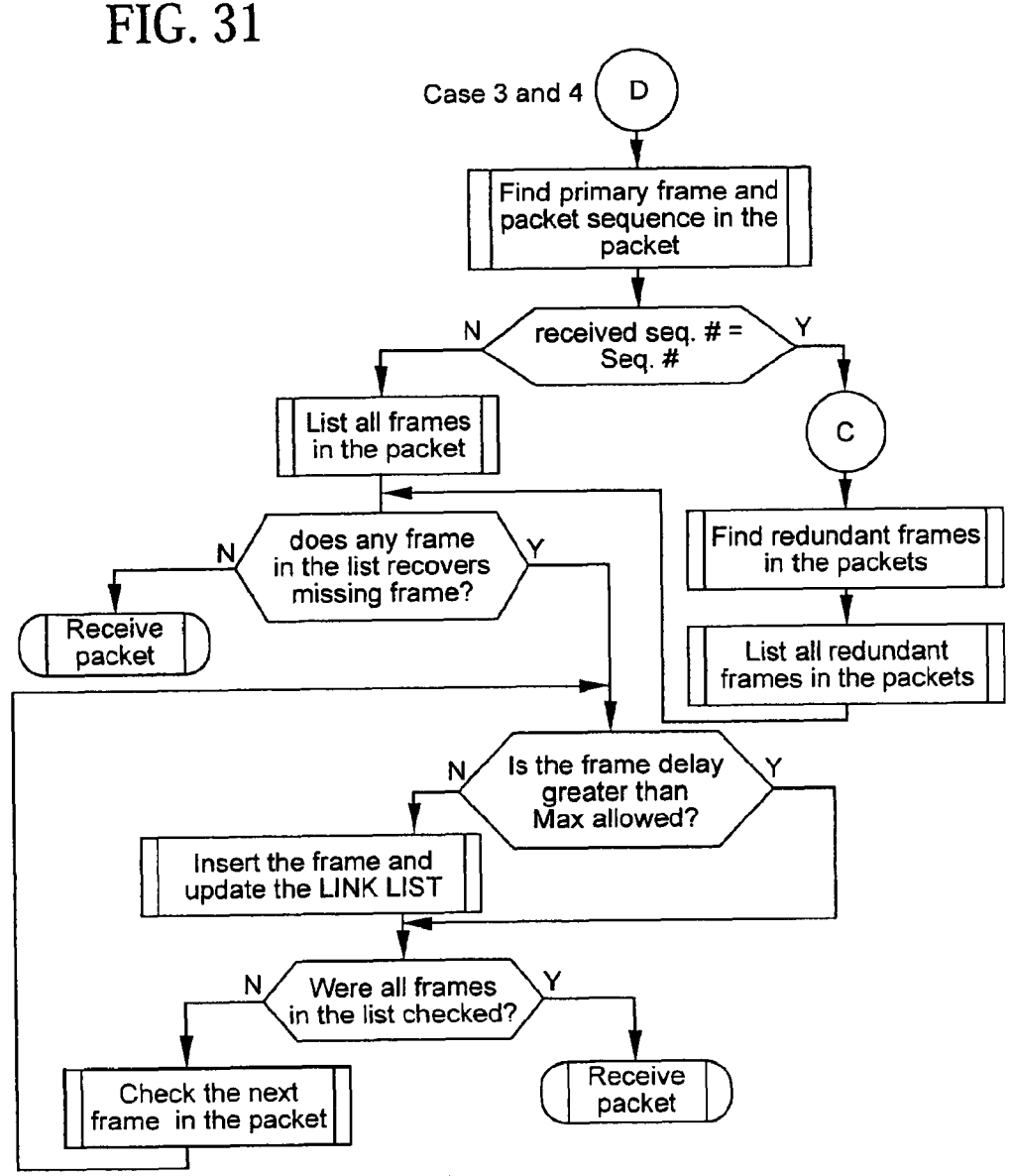

| | RFC2198 not supported | RFC2198 supported |
|---|---|---|
| Received Sequence Number is less than the current Sequence Number | Case 1 - FIGS. 28 and 29 | Case 3 - FIGS. 28 and 31 |
| Received Sequence Number is greater than the current Sequence Number | Case 2 - FIGS. 28 and 30 | Case 4 - FIGS. 28 and 31 |

It is to be noted that the Current Sequence number refers to the last valid sequence number, but does not imply that all prior packets have arrived. The above process is illustrated in the flowchart shown in FIGS. 28, 29, 30, and 31.

Case 1, as shown in FIGS. 28 and 29, occurs when a frame is received out of order (being late) and RFC2198 is not used. If the frame arrives before the maximum delay expires, the frame is placed in the position corresponding to its sequence number. If the frame is later than it is allowed (exceeds the maximum delay), the frame will be discarded. The current sequence number is not updated.

Case 2, as is also shown in FIGS. 28 and 29, occurs when a frame has a sequence number that is greater than the current sequence number and RFC2198 is not supported. If the received sequence number equals the current sequence number plus one in step 210, the frame is received in correct order. The frame is linked to the Link List 165 and the current sequence number is incremented by one in steps 212 and 214. If the difference between the received sequence number and the current sequence number is greater than one, then the received frame arrived earlier than the frame before it. In this instance, Frame Recovery 169 will insert a silence frame as the placeholder for each packet that is between the current sequence number and the received sequence number in step 216. For example, if the current sequence number is 2 and the received number is 5, Frame Recovery 169 will insert two (2) silence frames in the frame 3 and frame 4 positions and place the received frame in the frame 5's position. When frame 3 arrives, Frame Recovery 169 follows the case 1 scenario to insert frame 3.

Case 3, as shown in FIGS. 28 and 31, occurs when the received Sequence Number is less than the current Sequence Number and RFC2198 is used. Case 3 uses the same process as Case 1 except that:

1) case 3 will execute the same procedure as case 1 N times, where N is the number of frames in the packet, and 2) case 3 needs to use timestamp offset information in the RFC2198 packet to calculate the received sequence number for each non-primary frame in the packet. A non-primary frame is a frame that was sent in an earlier packet, in which it was the primary frame.

Case 4, as shown in FIGS. 28 and 31, occurs when the received Sequence Number is greater than the current Sequence Number and RFC2198 is supported. Case 4 also preferably uses the same process as case 3 to calculate the received sequence number for each non-primary frame in the packet, in addition to recovering the media packet sequence and storing the packet into the Session Buffer 171.

8.2.1.1 Dynamic Buffer Resizing/Limits

The network delay and delay variation may change from one call to the next. Therefore, the size of the Session Buffer needs to be dynamically adjusted from one call to the next call. By examining the distance from the frame read pointer to the frame write pointer, and the relative time stamp in the Link List 165, the Frame recovery 169 or the Decoder 174 is able to adjust the size of the Jitter Buffer. The Jitter Buffer is implemented in this invention by manipulating the frame write and read pointers and is measured by the number of frames.

The Jitter Buffer size is preferably not less than two frames or greater than a predetermined frame count. Jitter buffer size is determined by the network delay characteristics and the processing interval of the IP recording system.

Jitter Buffer is preferably dynamically monitored and adjusted at the start of each talk spurt for the coders that support the VAD (Voice activity Detection) algorithm or approximately every specified number of packets for CODECS that do not support the use of VAD to indicate the start of a talk spurt.

8.2.1.2 Jitter Buffer Overflow

Jitter buffer overflow occurs when the frame arrival rate is greater than the rate at which the Decoder 174 can process the frames. This symptom occurs when the distance between the "frame write pointer" and the "frame read pointer" exceeds the pre-determined Jitter Buffer size. When this occurs, Frame Recovery 169 preferably resets the frame write or read pointer and notifies the Resource Service Scheduler 172. The Resource Service Scheduler 172 may take action and request the Frame Recovery 169 to adjust the Jitter Buffer size when the next overflow occurs.

8.2.1.3 Jitter Buffer Underflow

Jitter Buffer underflow occurs when the frame arrival rate is slower than the rate at which the Decoder 174 processes the frames. This symptom occurs when the frame read pointer equals the frame write pointer. When this occurs, Frame Recovery 169 preferably resets the frame write or read pointer and notifies the Resource Service Scheduler 172.

8.2.1.4 Statistics

The following statistics are preferably maintained by Frame Recovery 169 process and can be retrieved by the Media Recording Application 92 on a per session basis. These statistics are preferably maintained during the entire session until the Media Recording Application 92 terminates the session:

1. Packets received—one count for each packet received, including late or duplicate packets.
2. Sequence number received (the low 16 bits include the highest sequence number received in an RTP data packet and the most significant 16 bits extend that sequence number with the corresponding count of sequence number cycles. Further detail regarding this feature is provided in RFC 3550, which is incorporated herein by reference.

8.2.2 Link List

Referring to FIG. 27 and 34, the Link List 165 is used as the interface between Frame Recovery 169 and Decoder 174. Frame Recovery 169 preferably notifies the Decoder when and where to retrieve the media data for the session via the Link List 165.

Each session has one link list. The first two entries of each list are the write pointer and read pointer, which are controlled (updated) by Frame Recovery 169 and Decoder 174 respectively. Following these two pointers, are the frame records. Each frame record consists of three fields: frame pointer pointing to the first byte of the frame in the Session Buffer 171, frame length, and frame time stamp indicating the corresponding frame's timing reference in the current session. Each time a frame is received, a frame record will be added and the Link List write pointer will be incremented by the Frame Recovery 169. The frame record is arranged in the order of the sequence number of the media packet. The packet is stored in Session Buffer 171 according to the received order.

FIG. 34 illustrates the relationship between the Session Table 167, Session Buffer 171, and Link List 165.

8.3 Resource Service Scheduler (A Timer)

Resource Service Scheduler 172 synchronizes the workflow between Frame Recovery 166, Decoder 174, Mixer and Encoder 178, and PCM & TSI 180. Resource Service Scheduler 172 is preferably a timer that periodically sends a service signal to the PLR 166, Decoder 174, Mixer and Encoder 178, and PCM & TSI 180 at a pre-determined interval. The timing reference for the Resource Scheduler may be supplied by the system, a local oscillator, the Frame Recovery 169, or the Computer Telephony Bus 181 (CT Bus). The resolution of the service signal is preferably configurable to optimize the overall performance in a given application environment. CTbus is an open TDM bus specification sponsored by ECTF (Enterprise Computer Telephony Forum).

8.4 Decoder and Linear Buffer

When the service signal is received from the Resource Service Scheduler 172, Decoder 174 preferably performs the following operations (FIG. 27):

1. inform the Mixer and Encoder 178 and PCM & TSI 180 of Session ID when a new session begins,
2. get session buffer address from the Link List 165 and read data from the Session Buffer 171;
3. determine the IP coder type and data length. The supported IP coder types include, but are not limited to A-or mu-law PCM, G.723.1, G.727, G.722, G.729a/b, GSM610, GSM-MS, NetCoder, Oki-ADPCM, and the like. The algorithm of these coders is specified in the respective standard, which is incorporated herein by reference.
4. decode the received media to linear PCM format;
5. store the linear PCM to the Linear Buffer 176; and
6. move to the next session until all sessions on the Link List 165 are served.

Figure 33:
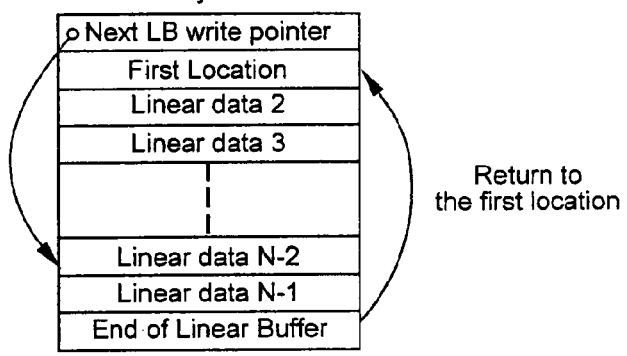
FIG. 33 shows the structure of a Linear Buffer.

Linear Buffer 176 stores the output of the Decoder 174. Linear Buffer 176 is organized such that each session has its own Linear Buffer and is implemented as a ring buffer. FIG. 33 illustrates the structure of the Linear buffer. Only Decoder 174 can write to the Linear Buffer 176. It can be read by many other components in the Media Processor subsystem.

The first word of the Linear Buffer 176 is the pointer to the next new "write" location. The component that reads the linear data is responsible for managing the read pointer (address). The base location and size of each Linear Buffer 176 are preferably initialized at system start up.

8.5 Mixer & Encoder

Mixer & Encoder 178 preferably encodes the linear data in the Linear Buffer 176 and forwards the encoded (compressed) data to Media Recording Application 92 (FIG. 26).

When the service signal is received from the Resource Service Scheduler 172, Mixer & Encoder 178 looks up its internal list of active sessions and retrieves the respective session media data from the Linear Buffer. It then encodes (compresses) the linear audio streams to a pre-determined format and passes it to the Media Recorder 102. Media Recorder 102 will then save it as a file, an external device, or in memory. The supported coder types for compression is preferably the same as listed for the Decoder 174. Mixer & Encoder 178 may also mix or sum two linear streams before encoding taking place.

Transcoding is used herein to refer to the process of converting a file, media file, or object from one format to another format. The advantages of performing the mixing, encoding, and/or transcoding function includes substantially reducing the storage space required for the file. These functions are the operational options of the recorder and are preferably configurable in accordance with the application.

The Mixer & Encoder 178 preferably performs the following operations:
1. setup the internal active session table when a new session begins (informed by the Decoder 174);
2. get the linear buffer address;
3. determine the data length;
4. determine the operation mode (pre-configured) for each session, such as mono, stereo, or mixed;
5. determine the encoder type (pre-configured) for each session;
6. encode the linear data and store the encoded data to memory that can be accessed by the Media Recording Application 92; and
7. signal the Media Recording Application 92 when data is available.

8.6 PCM and TSI

The PCM and TSI Function 180 is an optional function that reads the linear data, converts the linear data to PCM, and sends the PCM stream to a selected timeslot on the CT Bus.

Similarly, when the service signal is received from the Resource Service Scheduler 172, PCM and TSI 180 looks up its internal list of active sessions and retrieves the respective session media data from the Linear Buffer, and then transfers the data to a TDM transmit queue.

The PCM and TSI 180 preferably performs the following operations:
1. setup the internal active session table when a new session begins (informed by the Decoder 174) and maps the active session to a time slot on CTbus;
2. look up the session list;
3. get the linear buffer address;
4. determine the data length; and
5. move the data into TDM queue.

8.7 CTbus

CT bus is an open TDM bus specification sponsored by ECTF (Enterprise Computer Telephony Forum). The TSI 180 can route the data from any input time slot to any time slot on the CT bus.

9.0 Signaling Monitor

Figure 35:
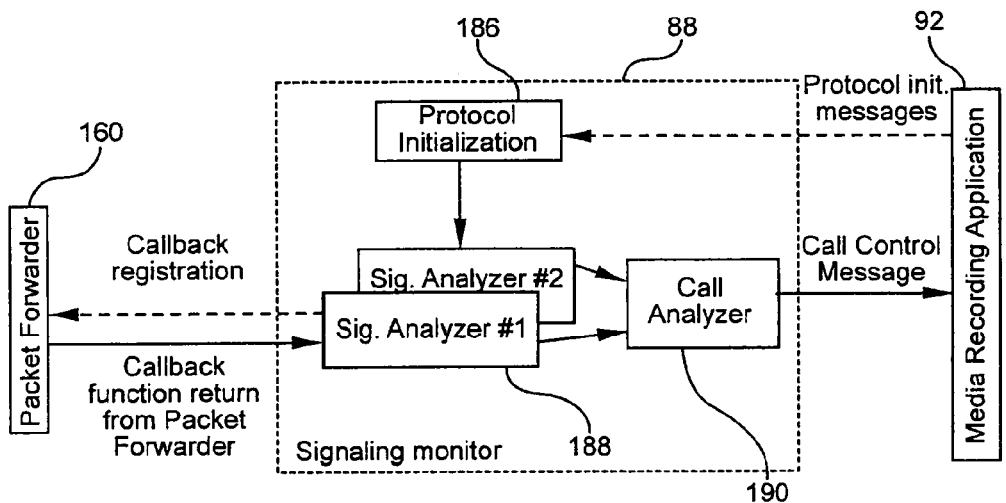
FIG. 35 is a block diagram of a Signaling Monitor shown in FIG. 14.

The purpose of the Signaling Monitor 88 shown in FIG. 14 is to analyze the signaling packets and determine the call state. The Signaling Monitor 88 inspects all incoming signaling packets received from the Packet Processor 86, analyzes the contents of the signaling packet to determine the call state of a VoIP call, and forwards the call state event to Session Service 100 of the Media Recording Application 92 shown in FIG. 35 where the session and recording decision is made.

The Signaling Monitor 88 preferably interfaces with two other sub-systems: the Packet Processor 86 and the Media Recording Application 92. Within the Signaling Monitor 88, there are preferably three functional blocks: a Protocol Initialization 186, Signaling Analyzer 188, and a Call Analyzer 190.

9.1 Interfaces 9.1.1 Interfacing with Packet Forwarder

When the Signal Analyzer 188 of the Signaling Monitor 88 is ready to accept the signaling packet, Signal Analyzer 188 sends a message to the Packet Forwarder 160 indicating the session ID (a unique Session assigned to each signaling protocol), destination port number, IP address, and protocol type of the signaling packets. This message is preferably sent once in the beginning of the operation. In order to receive the signaling packet, the Signaling Analyzer 188 preferably registers a callback function (referenced to the session ID) at Packet Forwarder 160 so that the Forwarder 160 knows where to forward the signaling packets. The callback function is preferably called for each packet. The second callback function call implies that the memory used in the last call can be released.

9.1.2 Interfacing with Media Recording Application 92

The Call Analyzer 190 of the Signaling Monitor 88 preferably sends a message to the Session Service 100 when a new call is initiated or a change on an existing call state occurs. Signaling information on the call can be sent to Session Service 100 when it is requested by the Session Service 100.

9.2 Process of Signaling Monitor 9.2.1 Protocol Initialization

When the Protocol Initialization 186 receives initialization messages from the System Service 98 (via Media Recording Application 92), it sends a signaling initialization message to all Signaling Analyzers 188. It is to be noted that there may be more than one protocol operating simultaneously in the same Signaling Monitor sub-system. The Signaling Initialization Message is preferably used to initialize and activate each Signaling Analyzer 188.

The signaling initialization Message preferably includes the IP address and port number of the Signaling Packet 94, the IP protocol type, and the operating parameters to identify the Signaling Packet. These operating parameters are preferably configured in the configuration profile 104. When the initialization message is received, each Signaling Analyzer 188 preferably initializes itself, registers itself with the Packet Forwarder 160 as described above, and begins to operate.

9.2.2 Signaling Analyzer

The purpose of the Signaling Analyzer 188 is to analyze the contents of the signaling packet and to map the information elements to a data structure known to the Call Analyzer 190. This data structure is preferably uniform across all Signaling Analyzers 188 of different protocols. Due to the significant differences between signaling protocols, there is preferably one Signaling Analyzer 188 for each protocol. For example, a VoIP recording system may simultaneously support both Cisco and Nortel IP PBX, each having different protocols.

After a Signaling Analyzer 188 is initiated, it preferably performs two tasks: 1) initiate a handshaking call to the Call analyzer 190 to initialize communication links, and 2) send a Registration Message to the Packet Forwarder 160. The first task is to ensure that the Call analyzer 190 are ready to receive signaling information, and the second task is to tell where to send the signaling packet after the first task is completed.

When the signaling packet is received from the Packet Forwarder 160, the Signaling Analyzer 188 looks for the call identifier in the signaling packet (each protocol has its own way to identify a call). If the call identifier is not presently known, Signaling Analyzer 188 will preferably create a call record to store the information contained in the signaling packet, and send a message containing the pointer of the call record, ID for the Signaling Analyzer, and the call identifier to the Call Analyzer 190, where a state machine is preferably created for the call. If the signaling packet is for an existing call, the Signaling Analyzer 188 will proceed to parse and map the information in the packet to the call record and send a message to the Call Analyzer 190.

Each protocol has a method to convey a call request, call progress, and call tear down message. It is the responsibility of the Signaling Analyzer 188 to abstract these differences and provide a uniform interface with the Call Analyzer 190.

The Signaling Analyzer, while parsing all packets, identifies error conditions associated with the telephone signaling or transport of audio information. These error conditions, analysis, or transport information are abstracted across a plurality of protocols or formats and passed through to the call analyzer with corresponding call reference information.

9.3 Call Analyzer

The Signaling Analyzer 188 preferably parses and translates each information element in the signaling packet to a common format, and the Call Analyzer 190 preferably uses this information to provide a high-level Call Control Interface 192 that is common to all underlying signaling protocols.

The Call Analyzer 190 preferably includes a state machine that includes, at a minimum, four states and is driven by messages from the Signaling Analyzer 188 including Call Requested, Call Connected, Call Hold, and Null, as summarized in Table 4.

(packets sent from IP phone 206) and one stream 210 (packets sent to IP phones 206). Tx and Rx signaling packets 210 are captured on from 212 as well.

It is to be understood that the various components, applications, subsystems, systems, and the like are preferably implemented in hardware and/or software using one or more of a microprocessor, microcontroller, application specific integrated circuit (ASIC), gate array, computer, and the like.

From the foregoing discussion, it will be appreciated by those skilled in the art that the VoIP Call Recorder of the present invention integrates with underlying VoIP technology and passes information to a call recording application. Employing passive tapping technology, the VoIP Call Recorder is capable of capturing call sessions on the network, decoding call control or signaling information, and providing

TABLE 4

| State | Messages from analyzer | Next state | Message to Media Recording Application | Response to analyzer |
|---|---|---|---|---|
| Null | "Call Request" | Call in progress | Call arrived | "Call request" acknowledgement |
| In progress | "Call Connected" and "Session identified" | Call connected | Call connected | No |
| Connected | "Release" | Null | Call Disconnected | "Release" acknowledgement |
| Connected | "Call Hold" | Call held | Call on-hold | No |
| Held" | "Call Resume" | Call Connected | Call resumed (implies session torn down) | No |

Figure 36:
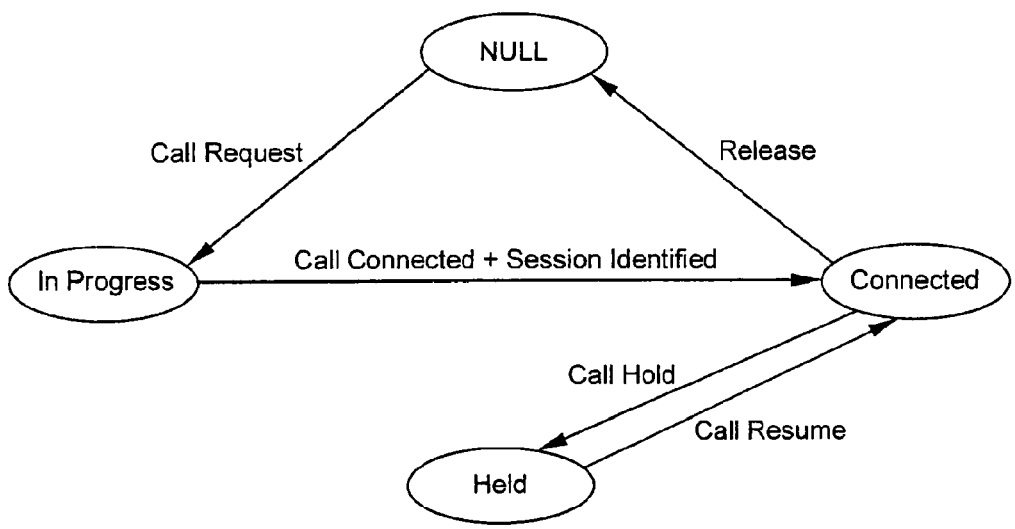
FIG. 36 is a graphical representation of a call state table provided in Table 3.

FIG. 36 shows a graphical representation of the call state table provided in Table 4.

10.0 Tapping an IP PBX System

Figure 37:
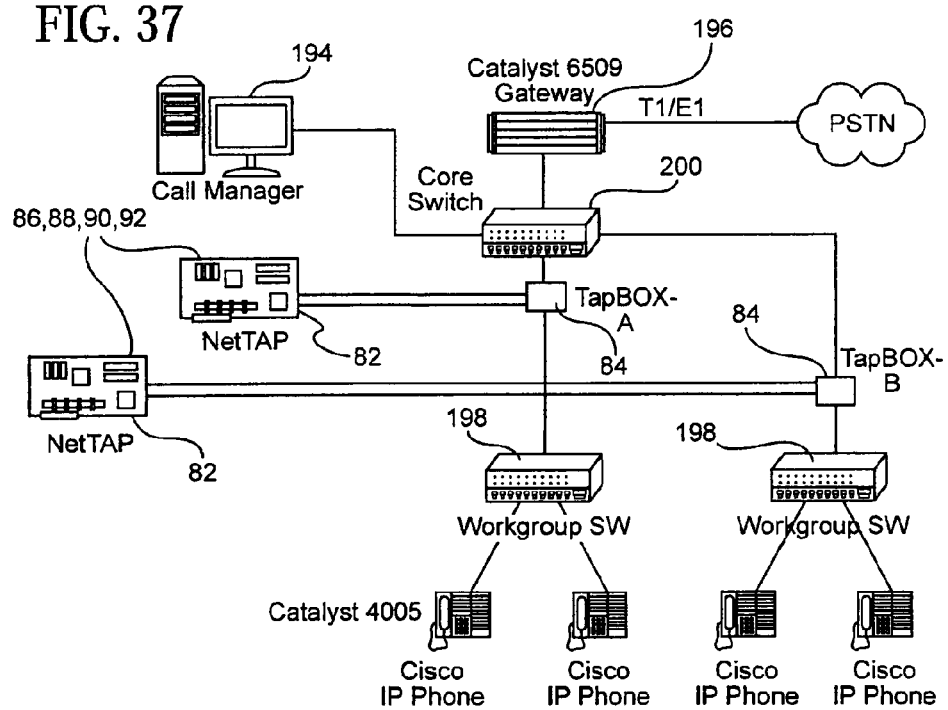
FIGS. 37-39 are block diagrams showing applications of the VoIP Call Recorder in accordance with the present invention to commercially available networks.
Figure 38:
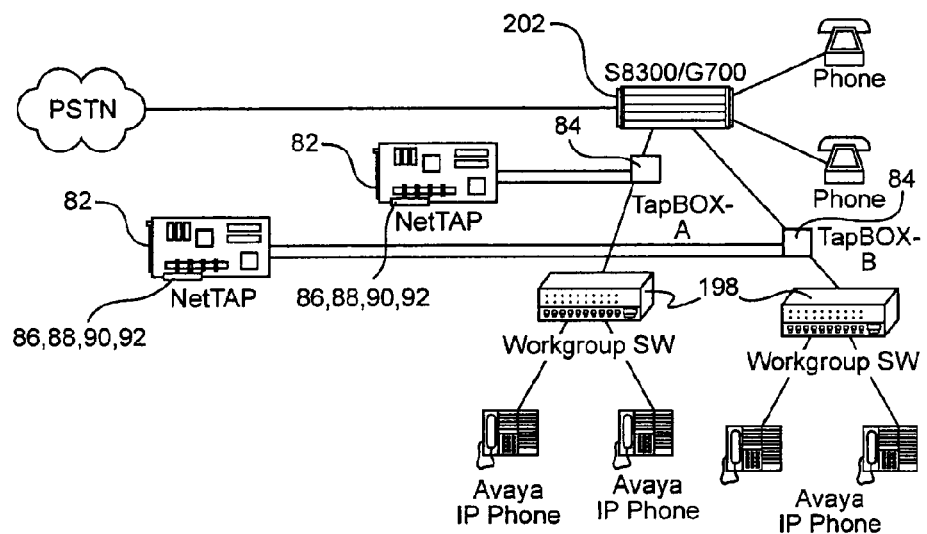
Figure 39:
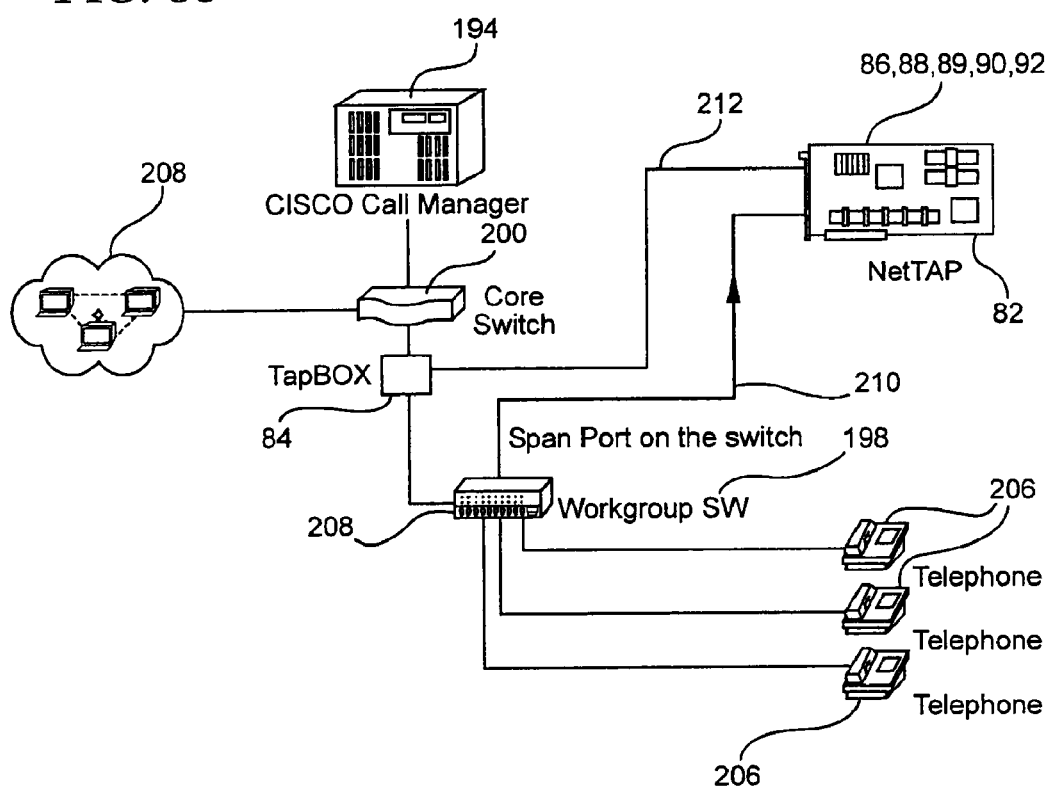

FIGS. 37-39 are block diagrams showing application of the VoIP Call Recorder 82 of the present invention to various commercially available network systems.

FIG. 37 illustrates a VoIP recorder configuration by which both external conversation and terminal control information can be monitored and recorded. This configuration includes a core switch 200, as the traffic hub, connecting to the Gateway 196, the Call manager 194, and multiple workgroup switches 198. This configuration supports multiple workgroup switches in a large system. One VoIP Call Recorder 82 and Tapbox 84 pair is installed on each IP link between the Core switch 200 and each workgroup switch 198.

FIG. 38 illustrates a configuration of the VoIP Call Recorder 82 installed with an Avaya system, in which the signaling server and gateway are integrated into one system 202. The Avaya system 202 includes both control signaling and the media RTP on the same IP link. One VoIP Call Recorder 82 and Tapbox 84 pair is installed on each IP link between the Avaya gateway 202 and each workgroup switch 199.

FIG. 39 illustrates a configuration in which external conversation, peer-to-peer conversation and terminal control information can be monitored and recorded. A span port 208 on a group switch 198 is preferably used in this configuration to monitor the packets sent to all IP phones 206. All transmit and receive voice packets to a WAN 208 are preferably monitored on the VoIP Call Recorder 82 by tapping before the Gateway 196.

In this scenario, voice recording of peer-to-peer conversation is preferably accomplished by summing two streams 210 via the span port. Voice recording of the external conversation is preferably accomplished by summing one stream 212 a mechanism for encoding and/or decoding voice, audio, data, and media information. Transcoding and/or compression of the information is advantageously used to substantially reduce the amount of resources required to store the information.

It will further be appreciated that the present invention provides a method and system for recording a voice call over a VoIP network without requiring modification of the users' telephone system or impairing normal operation of the network or telephone system. The method and system of the present invention provide significant advantages over the prior art by enabling users to quickly develop applications and release their product to market using a minimum of effort and available resources. The present invention can also be used with various types of VoIP networks including proprietary systems, such as those available from Cisco Systems, Inc. (www.cisco.com) and Avaya Inc. (www.Avaya.com) and others.

1.2.2 Quality of Service Analysis

With VoIP, networks designed to transmit data packets must now accommodate voice technologies. However, the convenience of merging two data paths onto a single physical network introduces the potential for risk. Network management tools, designed to monitor a Quality of Service (QoS) associated with data transmission are re-designed to manage and monitor the QoS of voice packet data transmission.

Like call recording applications, network management or QoS applications also rely on hardware components that tap into the telephone network and direct data to the monitoring application. Monitoring applications require all telephone signaling packets (VoIP packets), the voice conversation (RTP packets), as well as important statistical information from the transport of telephone signaling packets, such as checksum error analysis, dropped packet analysis, TCP/UDP transport error analysis, packet delay or jitter analysis, packet retransmission rate analysis, and the like.

Thus, the present invention provides a method and system for collecting network or transmission error conditions and correlating this information to corresponding individual telephone calls. The following types of transport information, errors, and/or analysis are provided in accordance with the disclosed embodiments;

call setup analysis;
cause of call being abandoned analysis;
TCP/UDP transport error analysis;
packets out of order and/or retransmitted analysis;
latency analysis;
RTCP analysis, such as jitter and packet count analysis; and
missing audio (RTP) packet analysis.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments, the methods described herein may be implemented by software programs tangibly embodied in a processor-readable medium and may be executed by a processor. Further, in an exemplary, non-limited embodiment, implementations can include distributed processing, component/object distributed processing, and parallel processing. Alternatively, virtual computer system processing can be constructed to implement one or more of the methods or functionality as described herein.

It is also contemplated that a computer-readable medium includes instructions or receives and executes instructions responsive to a propagated signal, so that a device connected to a network can communicate voice, video or data over the network. Further, the instructions may be transmitted or received over the network via the network interface device.

While the computer-readable medium may be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method of passively recording information associated with a VoIP communication session on a computer network comprising:
    tapping, by a tapping device, the computer network passively to obtain signaling information and media information without establishing a voice session with a recording device, the media information being in a first format;
    separating the signaling information from the media information;
    determining transport information from at least one of the signaling information and media information;
    transcoding the media information to a second format; and
    storing the transcoded media information in the second format, thereby monitoring information associated with a VoIP communication session on a computer network without requiring modification to the computer network and without impairing operation of the computer network, the first and second formats being digital formats.

2. The method of obtaining information associated with a VoIP communication session on a computer network as defined by claim 1, wherein the first format comprises at least one of G.711, A-law PCM, mu-law PCM, linear PCM, G.723.1, G.727, G.722, G.729a, G.729b, GSM610, GSM-MS, NetCoder, and Oki-ADPCM.

3. The method of obtaining information associated with a VoIP communication session on a computer network as defined by claim 1, wherein the second format comprises at least one of G.711, A-law PCM, mu-law PCM, linear PCM, G.723.1, G.727, G.722, G.729a, G.729b, GSM610, GSM-MS, NetCoder, and Oki-ADPCM.

4. The method of obtaining information associated with a VoIP communication session on a computer network as defined by claim 1, wherein the transport information comprises at least one of a quality analysis, Quality of Service (QOS) analysis, checksum analysis, dropped packet error analysis, TCP/UDP transport error analysis, packet delay analysis, packet retransmission rate analysis, latent call setup analysis, packet transport error analysis, dropped packet analysis, latency analysis, call setup analysis, cause of call being abandoned analysis, out-of-order packet analysis, retransmitted packet analysis, RTCP analysis, jitter analysis, packet count analysis, and missing audio packet analysis.

5. The method of obtaining information associated with a VoIP communication session on a computer network as defined by claim 1, further comprising correlating the transport information to the VoIP communication session.

6. The method of obtaining information associated with a VoIP communication session on a computer network as defined by claim 1, further comprising abstracting the transport information across a plurality of formats.

7. A system to passively record information associated with a VoIP communication session on a computer network comprising:
    a tapping device to passively tap the computer network to obtain signaling information and media information without establishing a voice session with a recording device, the media information being in a first format;
    a processing device to transcode the media information from the first format to a second format, the processing device separating the signaling information from the media information, the processing device determining transport information from at least one of the signaling information and media information; and
    a storage device to store the transcoded media information in the second format, thereby monitoring information associated with a VoIP communication session on a computer network without requiring modification to the computer network and without impairing operation of the computer network, the first and second formats being digital formats.

8. The system to obtain information associated with a VoIP communication session on a computer network as defined by claim 7, wherein the first format comprises at least one of G.711, A-law PCM, mu-law PCM, linear PCM, G.723.1, G.727, G.722, G.729a, G.729b, GSM610, GSM-MS, NetCoder, and Oki-ADPCM.

9. The system to obtain information associated with a VoIP communication session on a computer network as defined by claim 7, wherein the second format comprises at least one of G.711, A-law PCM, mu-law PCM, linear PCM, G.723.1, G.722, G.727, G.729a, G.729b, GSM610, GSM-MS, NetCoder, and Oki-ADPCM.

10. The system to passively record information associated with a VoIP communication session on a computer network as defined by claim 7, wherein the transport information comprises at least one of a quality analysis, Quality of Service (QOS) analysis, checksum analysis, dropped packet error analysis, TCP/UDP transport error analysis, packet delay analysis, packet retransmission rate analysis, latent call setup analysis, packet transport error analysis, dropped packet analysis, latency analysis, call setup analysis, cause of call being abandoned analysis, out-of-order packet analysis, retransmitted packet analysis, RTCP analysis, jitter analysis, packet count analysis, and missing audio packet analysis.

11. The system to obtain information associated with a VoIP communication session on a computer network as defined by claim 7, wherein the processing device correlates the transport information to the VoIP communication session.

12. The system to obtain information associated with a VoIP communication session on a computer network as defined by claim 7, wherein the processing device abstracts the transport information across a plurality of formats.

13. A tangible, non-transitory computer-readable storage medium comprising instructions that, when executed by a processing device, cause the processing device to passively record information associated with a VoIP communication session on a computer network by:
- tapping the computer network passively to obtain signaling information and media information without establishing a voice session with a recording device, the media information being in a first format;
- separating the signaling information from the media information;
- transcoding the media information to a second format; and
- storing the transcoded media information in the second format, thereby monitoring information associated with a VoIP communication session on a computer network without requiring modification to the computer network and without impairing operation of the computer network, the first and second formats being digital formats.

14. The tangible, non-transitory computer-readable storage medium as defined by claim 13, wherein the media information comprises at least one of data, voice, audio, and video information.

15. The tangible, non-transitory computer-readable storage medium as defined by claim 13, wherein the first format comprises at least one of G.711, A-law PCM, mu-law PCM, linear PCM, G.723.1, G.722, G.727, G.729a, G.729b, GSM610, GSM-MS, NetCoder, and Oki-ADPCM.

16. The tangible, non-transitory computer-readable storage medium as defined by claim 13, wherein the second format comprises at least one of G.711, A-law PCM, mu-law PCM, linear PCM, G.723.1, G.722, G.727, G.729a, G.729b, GSM610, GSM-MS, NetCoder, and Oki-ADPCM.

17. The tangible, non-transitory computer-readable storage medium as defined by claim 13, further comprising instructions that, when executed by a processing device, cause the processing device to passively record information associated with a VoIP communication session on a computer network by:
- determining whether an internet protocol (IP) address associated with the media information matches an IP address associated with the communication session; and
- discarding the media information in response to determining that the IP address associated with the media information does not match the IP address associated with the communication session.

18. The tangible, non-transitory computer-readable storage medium as defined by claim 13, wherein the information is organized in packets.

19. The tangible, non-transitory computer-readable storage medium as defined by claim 13, wherein the information in the second format requires less storage space than the information in the first format.

20. The tangible, non-transitory computer-readable storage medium as defined by claim 13, wherein the network comprises an internet protocol (IP)-based network.

21. The tangible, non-transitory computer-readable storage medium as defined by claim 13, wherein the network comprises at least one of a local area network (LAN) and a wide area network (WAN).

22. The tangible, non-transitory computer-readable storage medium as defined by claim 13, wherein the information is associated with a plurality of communication sessions.

23. The tangible, non-transitory computer-readable storage medium as defined by claim 13, further comprising instructions that, when executed by a processing device, cause the processing device to passively record information associated with a VoIP communication session on a computer network by:
- retrieving the stored information; and
- replaying the retrieved information in response to a request by a user.

24. The tangible, non-transitory computer-readable storage medium as defined by claim 13, wherein tapping the network passively to obtain media information in a first format further comprises tapping the network to obtain information flowing in an upstream and a downstream direction on the network.

25. The tangible, non-transitory computer-readable storage medium as defined by claim 13, wherein the signaling information comprises control information associated with the media information.

26. The tangible, non-transitory computer-readable storage medium as defined by claim 13, further comprising instructions that, when executed by a processing device, cause the processing device to passively record information associated with a VoIP communication session on a computer network by determining transport information from at least one of the signaling information and media information.

27. The tangible, non-transitory computer-readable storage medium as defined by claim 26, wherein the transport information comprises at least one of a quality analysis, Quality of Service (QOS) analysis, checksum analysis, dropped packet error analysis, TCP/UDP transport error analysis, packet delay analysis, packet retransmission rate analysis, latent call setup analysis, packet transport error analysis, dropped packet analysis, latency analysis, call setup analysis, cause of call being abandoned analysis, out-of-order packet analysis, retransmitted packet analysis, RTCP analysis, jitter analysis, packet count analysis, and missing audio packet analysis.

28. The tangible, non-transitory computer-readable storage medium as defined by claim 26, further comprising instructions that, when executed by a processing device, cause the processing device to passively record information associated with a VoIP communication session on a computer network by correlating the transport information to the VoIP communication session.

29. The tangible, non-transitory computer-readable storage medium as defined by claim 26, further comprising instructions that, when executed by a processing device, cause the processing device to passively record information associated with a VoIP communication session on a computer network by abstracting the transport information across a plurality of formats.

* * * * *